US008891178B2

(12) United States Patent
Hsu et al.

(10) Patent No.: US 8,891,178 B2
(45) Date of Patent: *Nov. 18, 2014

(54) OPTICAL LENS SYSTEM

(75) Inventors: Chih-Wen Hsu, Taichung (TW);
Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 99 days.

This patent is subject to a terminal disclaimer.

(21) Appl. No.: 13/532,488

(22) Filed: Jun. 25, 2012

(65) Prior Publication Data
US 2013/0208365 A1    Aug. 15, 2013

(30) Foreign Application Priority Data

Feb. 15, 2012    (TW) .............................. 101104861 A

(51) Int. Cl.
*G02B 3/02*  (2006.01)
*G02B 13/18*  (2006.01)
*G02B 13/00*  (2006.01)
*G02B 9/34*  (2006.01)

(52) U.S. Cl.
CPC ............... *G02B 13/004* (2013.01); *G02B 9/34* (2013.01); *G02B 13/18* (2013.01)
USPC .......................................... 359/715; 359/708

(58) Field of Classification Search
CPC ......... G02B 9/34; G02B 13/004; G02B 13/18
USPC ......... 359/335, 357, 714, 715, 716, 774, 775, 359/784
See application file for complete search history.

(56) References Cited

U.S. PATENT DOCUMENTS

| | | | |
|---|---|---|---|
| 6,728,047 B2 * | 4/2004 | Sato et al. ...................... 359/786 |
| 6,950,246 B2 * | 9/2005 | Amanai ......................... 359/771 |
| 7,365,920 B2 | 4/2008 | Noda | |
| 7,535,658 B2 * | 5/2009 | Taniyama ...................... 359/772 |
| 7,633,690 B2 * | 12/2009 | Yasuhiko ....................... 359/773 |
| 7,848,032 B1 | 12/2010 | Chen et al. | |
| 8,014,080 B1 * | 9/2011 | Chen et al. .................... 359/715 |
| 8,325,269 B2 * | 12/2012 | Chen et al. .................... 348/360 |
| 8,422,151 B2 * | 4/2013 | Lai et al. ....................... 359/780 |
| 8,441,745 B2 * | 5/2013 | Tang et al. ..................... 359/717 |
| 8,508,865 B2 * | 8/2013 | Teraoka ......................... 359/773 |
| 2007/0081258 A1 * | 4/2007 | Huang .......................... 359/715 |
| 2010/0020417 A1 * | 1/2010 | Lin ............................... 359/715 |

(Continued)

*Primary Examiner* — Thomas K Pham
*Assistant Examiner* — Nicholas Pasko
(74) *Attorney, Agent, or Firm* — Tim Tingkang Xia, Esq.; Morris, Manning & Martin, LLP

(57) ABSTRACT

This invention provides an optical lens system in order from an object side to an image side comprising: a first lens element having a convex object-side surface; a negative second lens element having a concave object-side surface and a convex image-side surface; a positive third lens element having a convex object-side surface and a convex image-side surface; a plastic negative fourth lens element having a concave object-side surface and a convex image-side surface, with both the object-side and image-side surfaces thereof being aspheric. By such arrangement, the incident angle of off-axis light projected onto the sensor can be suppressed for improving the sensitivity of the sensor effectively. Also, a sufficient back focal length can be retained for disposing other optical elements (e.g., an IR-pass filter), and thereby the system can be more suitable for the infrared aspect of optical imaging systems.

26 Claims, 21 Drawing Sheets

(56) References Cited

U.S. PATENT DOCUMENTS

| | | | |
|---|---|---|---|
| 2010/0321793 A1* | 12/2010 | Lin | 359/715 |
| 2011/0058262 A1* | 3/2011 | Chen et al. | 359/738 |
| 2011/0069378 A1* | 3/2011 | Lin et al. | 359/356 |
| 2011/0188131 A1* | 8/2011 | Sano | 359/714 |
| 2012/0327522 A1* | 12/2012 | Tsai et al. | 359/715 |
| 2013/0208354 A1* | 8/2013 | Tsai et al. | 359/357 |

* cited by examiner

US 8,891,178 B2

OPTICAL LENS SYSTEM

CROSS-REFERENCE TO RELATED APPLICATIONS

This non-provisional application claims priority under 35 U.S.C. §119(a) on Patent Application No. 101104861 filed in Taiwan R.O.C on Feb. 15, 2012, the entire contents of which are hereby incorporated by reference.

BACKGROUND OF THE INVENTION

1. Field of the Invention

The present invention relates to an optical lens system, and more particularly, to a compact optical lens system used in electronic products for infrared band or visible light band.

2. Description of the Prior Art

In recent years, the application of imaging lens systems is getting wider and wider, especially in computer webcams, automotive lens assemblies, surveillance cameras, and electronic game devices. Generally, the sensor of a general photographing camera is none other than CCD (Charge Coupled Device) or CMOS device (Complementary Metal Oxide Semiconductor device). Along with the advances in semiconductor manufacturing technology, the pixel size of sensors is reduced leading compact imaging lens systems to higher resolution. In the meantime, the demand for better image quality is also increased.

A conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing.

Besides, although the four-lens system disclosed in U.S. Pat. No. 7,848,032 does not have the aforesaid disadvantages, the system fails to be well-designed for infrared band. In considering the current situation that applications of lens systems capable in detecting infrared ray are getting more and more, the conventional four-lens systems designed only for visible light can no longer satisfy the current demands in the field.

In light of foregoing, there is a need for a compact lens system with excellent image quality and sensing susceptibility for portable electronic products, which can be applied not only in visible light band, but also in detecting infrared ray at night or circumstance of insufficient light source for catching high quality infrared image.

SUMMARY OF THE INVENTION

The present invention provides an optical lens system, in order from an object side to an image side comprising: a first lens element having a convex object-side surface; a second lens element with negative refractive power having a concave object-side surface and a convex image-side surface; a third lens element with positive refractive power having a convex object-side surface and a convex image-side surface; a plastic fourth lens element with negative refractive power having a concave object-side surface and a convex image-side surface, with both the object-side and image-side surfaces thereof being aspheric; wherein the optical lens system comprises four lens elements with refractive power; wherein a focal length of the fourth lens element is f4, a focal length of the optical lens system is f, an axial distance between the second lens element and the third lens element is T23, an axial distance between the third lens element and the fourth lens element is T34, a central thickness of the third lens element is CT3, and they satisfy the following relations: $-1.25 < f4/f < -0.30$; and $0 < (T23+T34)/CT3 < 0.85$.

On the other hand, the present invention provides an optical lens system, in order from an object side to an image side comprising: a first lens element having a convex object-side surface; a second lens element with negative refractive power having a concave object-side surface and a convex image-side surface; a third lens element with positive refractive power; a plastic fourth lens element with negative refractive power having a concave object-side surface and a convex image-side surface, with both the object-side and image-side surfaces thereof being aspheric; wherein the optical lens system comprises four lens elements with refractive power; wherein a focal length of the optical lens system is f, a focal length of the first lens element is f1, a focal length of the fourth lens element is f4, an axial distance between the second lens element and the third lens element is T23, an axial distance between the third lens element and the fourth lens element is T34, a central thickness of the third lens element is CT3, and they satisfy the following relations: $-0.70 < f/f1 < 0.90$; $-1.25 < f4/f < -0.30$; and $0 < (T23+T34)/CT3 < 0.85$.

Furthermore, the present invention provides an optical lens system, in order from an object side to an image side comprising: a first lens element having a convex object-side surface; a second lens element with negative refractive power having a concave object-side surface and a convex image-side surface; a third lens element with positive refractive power having a convex object-side surface and a convex image-side surface; a plastic fourth lens element with negative refractive power having a concave object-side surface and a convex image-side surface, with both the object-side and image-side surfaces thereof being aspheric; wherein the shape of the object-side surface of the fourth lens element changes from concave when near the optical axis to convex when away from the optical axis; wherein the optical lens system comprises four lens elements with refractive power; wherein an axial distance between the second lens element and the third lens element is T23, an axial distance between the third lens element and the fourth lens element is T34, a central thickness of the third lens element is CT3, a back focal length of the optical lens system is BFL, and they satisfy the following relations: $0 < (T23+T34)/CT3 < 0.85$; and $1.45 < BFL/CT3 < 3.5$.

By such arrangement, the incident angle of off-axis light projected onto the sensor can be suppressed for improving the sensitivity of the sensor effectively. Also, a sufficient back focal length can be retained for disposing other optical elements (e.g., an IR-pass filter), and thereby the system can be more suitable for the infrared aspect of optical imaging systems.

In the aforementioned optical lens system, the first lens element can have positive refractive power and thereby can provide significant refractive power needed for the system, which is favorable for reducing the total track length thereof. When the second lens element has negative refractive power, the aberration produced by the first lens element with positive refractive power can be effectively corrected. When the third lens element has positive refractive power, a sufficient back focal length can be obtained for the system, which is favorable for placing other optical elements (such as various optical filters), and thereby the optical lens system is more suitable for being applied in infrared imaging system. When the fourth lens element has negative refractive power, a positive-negative telephoto structure is formed with the third lens element so that the back focal length of the system is favorably reduced for obtaining the effect of reducing the total track length thereof.

In the aforementioned optical lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. When the second lens element has a concave object-side surface and a convex image-side surface, the astigmatism of the system can be favorably corrected. When the third lens element is a bi-convex lens element, the refractive power of the third lens element can be effectively strengthened, and thereby the object of reducing total track length of the system can be achieved while reducing sensitivity thereof. When the fourth lens element has a concave object-side surface and a convex image-side surface, the incident angle of off-axis ray on the image sensor can be effectively reduced so that the sensing sensitivity of the system can be improved and the astigmatism thereof can be corrected. Furthermore, when the shape of the object-side surface of the fourth lens element changes from concave when near the optical axis to convex when away from the optical axis, it has the effect of reducing the incident angle on the image sensor from the off-axis field, and thereby the sensing sensitivity of the system can be improved.

DETAILED DESCRIPTION OF THE PREFERRED EMBODIMENTS

Figure 1A:
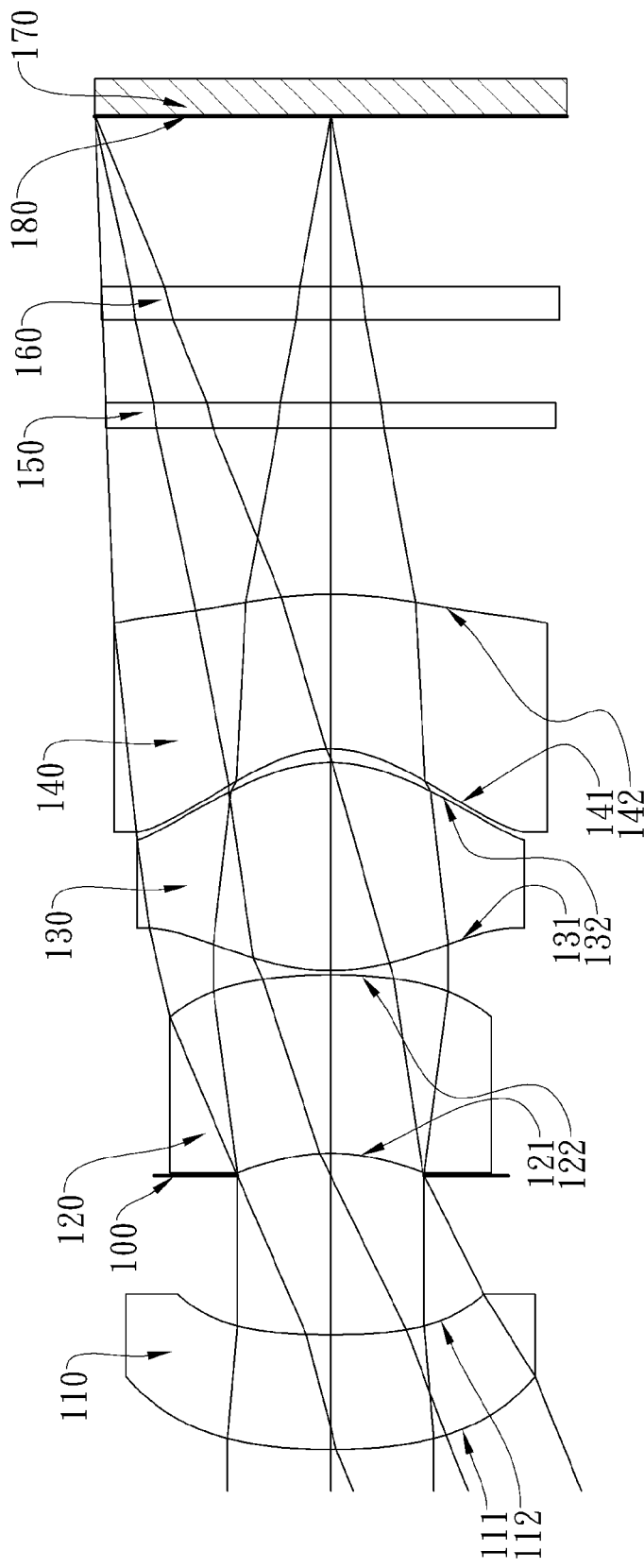
FIG. 1A shows an optical lens system in accordance with a first embodiment of the present invention.

The present invention provides an optical lens system, in order from an object side to an image side comprising: a first lens element having a convex object-side surface; a second lens element with negative refractive power having a concave object-side surface and a convex image-side surface; a third lens element with positive refractive power having a convex object-side surface and a convex image-side surface; a plastic fourth lens element with negative refractive power having a concave object-side surface and a convex image-side surface, with both the object-side and image-side surfaces thereof being aspheric; wherein the optical lens system comprises four lens elements with refractive power; wherein a focal length of the fourth lens element is f4, a focal length of the optical lens system is f, an axial distance between the second lens element and the third lens element is T23, an axial distance between the third lens element and the fourth lens element is T34, a central thickness of the third lens element is CT3, and they satisfy the following relations: $-1.25 < f4/f < -0.30$; and $0 < (T23+T34)/CT3 < 0.85$.

When the relation of $-1.25 < f4/f < -0.30$ is satisfied, the fourth lens element can effectively correct the high order aberration produced by the third lens element for improving image quality. In addition, the fourth lens element with negative refractive power and the third lens element with positive refractive power can form a positive-negative telephoto structure, which is favorable for reducing the back focal length as well as the total track length.

When the relation of $0 < (T23+T34)/CT3 < 0.85$ is satisfied, the relation of the thickness of the third lens element and the spacing of the third lens element among other lens elements is more suitable; therefore, the thickness of the third lens element and the total track length of the system are well-controlled for manufacturing and assembling of the system; preferably, the following relation is satisfied: $0 < (T23+T34)/CT3 < 0.40$.

In the aforementioned optical lens system, a composite focal length of the third lens element and the fourth lens element is f34, the focal length of the optical lens system is f, and they preferably satisfy the following relation: $0.2 < f34/f < 2.0$. When the above relation is satisfied, the fourth lens element with negative refractive power and the third lens element with positive refractive power can form a positive-negative telephoto structure, which is favorable for reducing the back focal length as well as the total track length. In addition, the composite focal length of the third lens element and the fourth lens element can effectively distribute the positive refractive power of the system.

In the aforementioned optical lens system, the system further comprises a stop, an axial distance between the stop and the image-side surface of the fourth lens element is SD, an axial distance between the object-side surface of the first lens element and the image-side surface of the fourth lens element is TD, and they preferably satisfy the following relation:

$0.50<SD/TD<0.93$. When the above relation is satisfied, it is favorable for the system to obtain a balance between the properties of telecentricity and wide field of view.

In the aforementioned optical lens system, a field of view of the optical lens system is FOV, and it preferably satisfies the following relation: 25 degree<FOV<80 degree. When the above relation is satisfied, it not only ensures that the system has enough field of view but also avoids the disadvantage of high image warping and distortion resulting from excessively large field of view.

In the aforementioned optical lens system, an Abbe number of the first lens element is V1, an Abbe number of the second lens element is V2, and they preferably satisfy the following relation: $|V1-V2|<15$. When the above relation is satisfied while selecting materials with suitable Abbe number in manufacturing the lens elements, not only the costs can be lowered, but also the effect of correcting the chromatic aberration of the system can be obtained.

In the aforementioned optical lens system, the focal length of the optical lens system is f, a focal length of the first lens element is f1, and they preferably satisfy the following relation: $-0.70<f/f1<0.90$. When the above relation is satisfied, the refractive power of the first lens element is more suitable; wherein the total track length can be favorably shortened with a positive first lens element, and the field of view can be favorably enhanced with a negative first lens element; more preferably, the following relation is satisfied: $-0.65<f/f1<0.65$.

In the aforementioned optical lens system, a curvature radius of the object-side surface of the fourth lens element is R7, the focal length of the optical lens system is f, and they preferably satisfy the following relation: $-0.7<R7/f<0$. When the above relation is satisfied, the curvature of the object-side surface of the fourth lens element can be adjusted for improving the correction of the high order aberration produced by the system.

In the aforementioned optical lens system, a back focal length of the optical lens system is BFL, the central thickness of the third lens element is CT3, and they preferably satisfy the following relation: $1.45<BFL/CT3<3.5$. When the above relation is satisfied, it ensures that the system has sufficient back focal length for placing other required elements.

In the aforementioned optical lens system, a chief ray angle of the optical lens system is CRA, and it preferably satisfies the following relation: $0<\tan(CRA)<0.4$. When the above relation is satisfied, the incident angle on the image sensor can be reduced so that the sensing sensitivity of the system can be improved.

In a preferable embodiment of the aforementioned optical lens system, the optical lens system is applicable for the wavelength range of 750 nm~1200 nm. That is, the optical lens system is suitable for applications at infrared band.

On the other hand, the present invention provides an optical lens system, in order from an object side to an image side comprising: a first lens element having a convex object-side surface; a second lens element with negative refractive power having a concave object-side surface and a convex image-side surface; a third lens element with positive refractive power; a plastic fourth lens element with negative refractive power having a concave object-side surface and a convex image-side surface, with both the object-side and image-side surfaces thereof being aspheric; wherein the optical lens system comprises four lens elements with refractive power; wherein a focal length of the optical lens system is f, a focal length of the first lens element is f1, a focal length of the fourth lens element is f4, an axial distance between the second lens element and the third lens element is T23, an axial distance between the third lens element and the fourth lens element is T34, a central thickness of the third lens element is CT3, and they satisfy the following relations: $-0.70<f/f1<0.90$; $-1.25<f4/f<-0.30$; and $0<(T23+T34)/CT3<0.85$.

When the relation of $-0.70<f/f1<0.90$ is satisfied, the refractive power of the first lens element is more suitable; wherein the total track length can be favorably shortened with a positive first lens element, and the field of view can be favorably enhanced with a negative first lens element.

When the relation of $-1.25<f4/f<-0.30$ is satisfied, the fourth lens element can effectively correct the high order aberration produced by the third lens element for improving image quality. In addition, the fourth lens element with negative refractive power and the third lens element with positive refractive power can form a positive-negative telephoto structure, which is favorable for reducing the back focal length as well as the total track length.

When the relation of $0<(T23+T34)/CT3<0.85$ is satisfied, the relation of the thickness of the third lens element and the spacing of the third lens element among other lens elements is more suitable; therefore, the thickness of the third lens element and the total track length of the system are well-controlled for manufacturing and assembling of the system.

In the aforementioned optical lens system, a composite focal length of the third lens element and the fourth lens element is f34, the focal length of the optical lens system is f, and they preferably satisfy the following relation: $0.2<f34/f<2.0$. When the above relation is satisfied, the fourth lens element with negative refractive power and the third lens element with positive refractive power can form a positive-negative telephoto structure, which is favorable for reducing the back focal length as well as the total track length. In addition, the composite focal length of the third lens element and the fourth lens element can effectively distribute the positive refractive power of the system.

In the aforementioned optical lens system, a curvature radius of the object-side surface of the third lens element is R5, the focal length of the optical lens system is f, and they preferably satisfy the following relation: $0<R5/f<0.7$. When the above relation is satisfied, the curvature of the third lens element is more suitable for adjusting the refractive power thereof. In addition, sufficient back focal length is provided for the system, which is favorable for placing other optical elements (such as filters) between the rear of the lens element and an image plane. Therefore, the optical lens system is more suitable for applications in the field of infrared imaging system.

In the aforementioned optical lens system, a back focal length of the optical lens system is BFL, the central thickness of the third lens element is CT3, and they preferably satisfy the following relation: $1.45<BFL/CT3<3.5$. When the above relation is satisfied, it ensures that the system has sufficient back focal length for placing other required elements.

In the aforementioned optical lens system, an Abbe number of the first lens element is V1, an Abbe number of the second lens element is V2, and they preferably satisfy the following relation: $|V1-V2|<15$. When the above relation is satisfied while selecting materials with suitable Abbe number in manufacturing the lens elements, not only the costs can be lowered, but also the effect of correcting the chromatic aberration of the system can be obtained.

In the aforementioned optical lens system, a field of view of the optical lens system is FOV, and it preferably satisfies the following relation: 25 degree<FOV<80 degree. When the above relation is satisfied, it not only ensures that the system has enough field of view but also avoids the disadvantage of high image warping and distortion resulting from excessively large field of view.

In a preferable embodiment of the aforementioned optical lens system, the optical lens system is applicable for the wavelength range of 750 nm~1200 nm. That is, the optical lens system is suitable for applications at infrared band.

In the aforementioned optical lens system, a chief ray angle of the optical lens system is CRA, and it preferably satisfies the following relation: $0<\tan(CRA)<0.4$. When the above relation is satisfied, the incident angle on the image sensor can be reduced so that the sensing sensitivity of the system can be improved.

Furthermore, the present invention provides an optical lens system, in order from an object side to an image side comprising: a first lens element having a convex object-side surface; a second lens element with negative refractive power having a concave object-side surface and a convex image-side surface; a third lens element with positive refractive power having a convex object-side surface and a convex image-side surface; a plastic fourth lens element with negative refractive power having a concave object-side surface and a convex image-side surface, with both the object-side and image-side surfaces thereof being aspheric; wherein the shape of the object-side surface of the fourth lens element changes from concave when near the optical axis to convex when away from the optical axis; wherein the optical lens system comprises four lens elements with refractive power; wherein an axial distance between the second lens element and the third lens element is T23, an axial distance between the third lens element and the fourth lens element is T34, a central thickness of the third lens element is CT3, a back focal length of the optical lens system is BFL, and they satisfy the following relations: $0<(T23+T34)/CT3<0.85$; and $1.45<BFL/CT3<3.5$.

When the relation of $0<(T23+T34)/CT3<0.85$ is satisfied, the relation of the thickness of the third lens element and the spacing of the third lens element among other lens elements is more suitable; therefore, the thickness of the third lens element and the total track length of the system are well-controlled for manufacturing and assembling of the system.

When the relation of $1.45<BFL/CT3<3.5$ is satisfied, it ensures that the system has sufficient back focal length for placing other required elements.

In the aforementioned optical lens system, the focal length of the optical lens system is f, a focal length of the first lens element is f1, and they preferably satisfy the following relation: $-0.70<f/f1<0.90$. When the above relation is satisfied, the refractive power of the first lens element is more suitable; wherein the total track length can be favorably shortened with a positive first lens element, and the field of view can be favorably enhanced with a negative first lens element.

In the aforementioned optical lens system, a focal length of the fourth lens element is f4, a focal length of the first lens element is f1, and they preferably satisfy the following relation: $-1.25<f4/f<-0.30$. When the above relation is satisfied, the fourth lens element can effectively correct the high order aberration produced by the third lens element for improving image quality. In addition, the fourth lens element with negative refractive power and the third lens element with positive refractive power can form a positive-negative telephoto structure, which is favorable for reducing the back focal length as well as the total track length.

In the aforementioned optical lens system, a chief ray angle of the optical lens system is CRA, and it preferably satisfies the following relation: $0<\tan(CRA)<0.4$. When the above relation is satisfied, the incident angle on the image sensor can be reduced so that the sensing sensitivity of the system can be improved.

In a preferable embodiment of the aforementioned optical lens system, the optical lens system is applicable for the wavelength range of 750 nm~1200 nm. That is, the optical lens system is suitable for applications at infrared band.

In the aforementioned optical lens system, the lens elements can be made of glass or plastic material. If the lens elements are made of glass, the freedom for distributing the refractive power of the optical lens system can be increased. If plastic material is adopted to produce the lens elements, the production costs will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the optical lens system can be effectively reduced.

The present optical lens system may comprise at least one stop. Said stop includes but not limits to an aperture stop, a glare stop, or a field stop. Said glare stop or said field stop can be configured for reducing stray light resulting in improved image quality.

In the present optical lens system, a stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enhancing the field of view of the optical lens system as well as providing features associated with a wider field of view.

Figure 11:
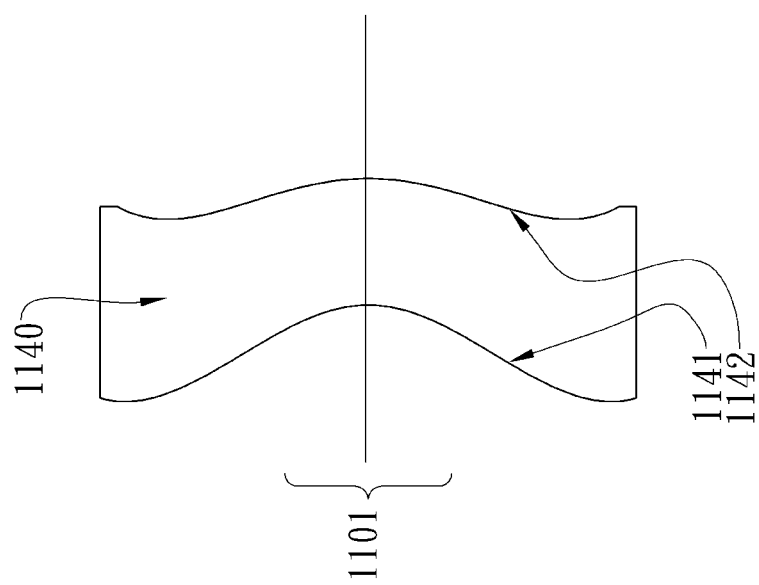
FIG. 11 shows the changes in the shape of the object-side surface of the fourth lens element of the present invention.

In the present optical lens system, if a lens element has a convex surface, it means the portion of the surface in proximity to the optical axis is convex; if a lens element has a concave surface, it means the portion of the surface in proximity to the optical axis is concave. Please refer to FIG. 11; the fourth lens element 1140 has a concave objet-side surface 1141 and a convex image-side surface 1142. As mentioned before, the object-side surface 1141 is described as concave. More specifically, the shape of the object-side surface 1141 of the fourth lens element 1140 changes from concave when near the optical axis 1101 to convex when away from the optical axis.

Preferred embodiments of the present invention will be described in the following paragraphs by referring to the accompanying drawings.

Embodiment 1

Figure 1B:
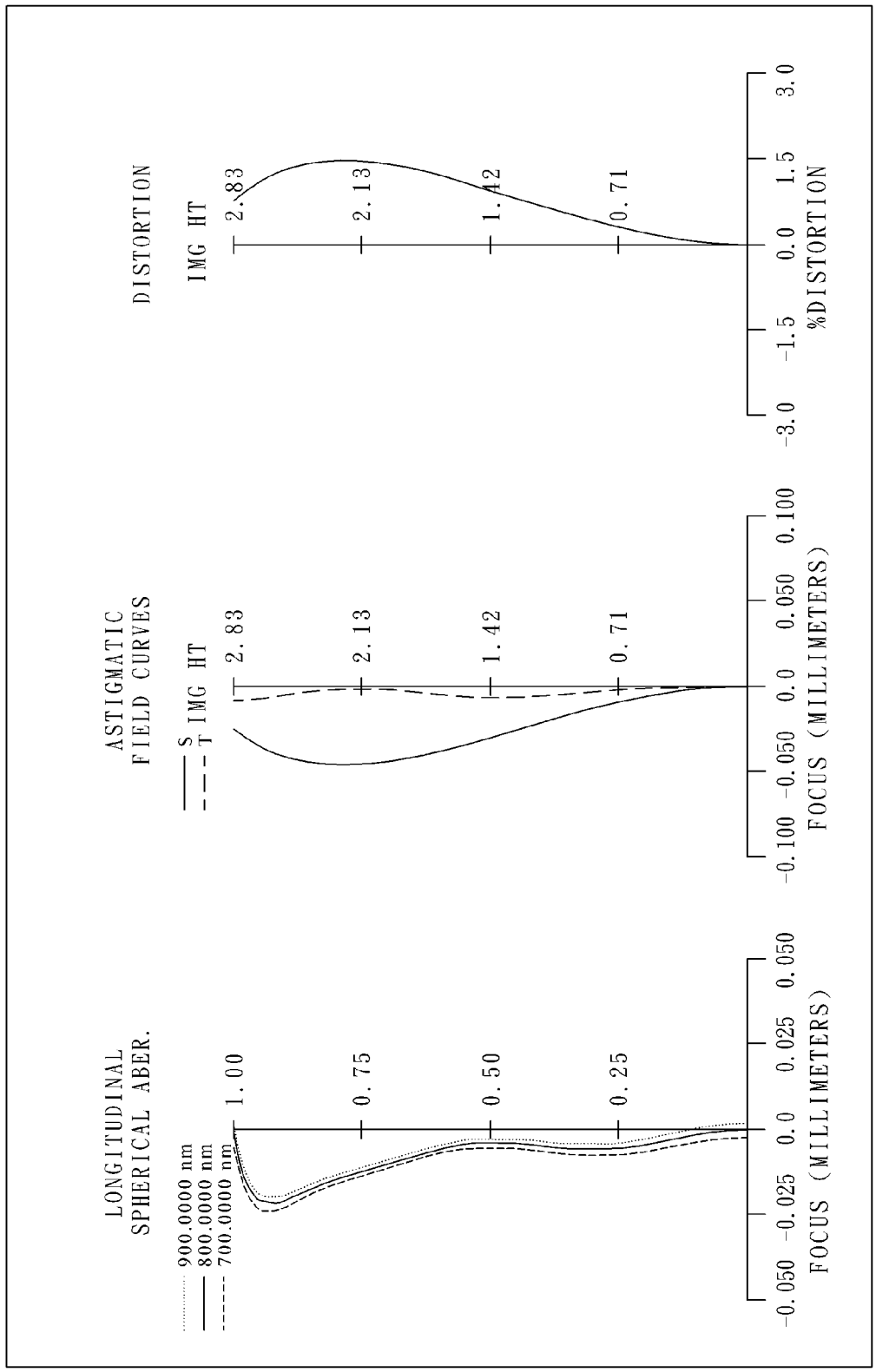
FIG. 1B shows the aberration curves of the first embodiment of the present invention.

FIG. 1A shows an optical lens system in accordance with the first embodiment of the present invention, and FIG. 1B shows the aberration curves of the first embodiment of the present invention. The optical lens system of the first embodiment of the present invention mainly comprises four lens elements, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a concave object-side surface 121 and a convex image-side surface 122, the object-side and image-side surfaces 121 and 122 thereof being aspheric;

a plastic third lens element 130 with positive refractive power having a convex object-side surface 131 and a convex image-side surface 132, the object-side and image-side surfaces 131 and 132 thereof being aspheric; and a plastic fourth lens element 140 with negative refractive power having a concave object-side surface 141 and a convex image-side surface 142, the object-side and image-side surfaces 141 and 142 thereof being aspheric; wherein, the shape of the object-side surface 141 of the fourth lens element 140 changes from concave when near the optical axis to convex when away from the optical axis;

wherein a stop, which can be an aperture stop 100, is disposed between the first lens element 110 and the second lens element 120;

the optical lens system further comprises a filter 150 disposed between the image-side surface 142 of the fourth lens element 140 and a cover glass 160; the filter 150 is an IR pass-filter made of glass and has no influence on the focal length of the optical lens system; the optical lens system further comprises an image sensor 170 provided on an image plane 180.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present optical lens system, the focal length of the optical lens system is f, and it satisfies the following relation: f=6.94 (mm).

In the first embodiment of the present optical lens system, the f-number of the optical lens system is Fno, and it satisfies the relation: Fno=2.80.

TABLE 1

(Embodiment 1)
f = 6.94 mm, Fno = 2.80, HFOV = 22.1 deg.

| Surface # | | Curvature Radius | Thickness | Material | Index | Focal length |
|---|---|---|---|---|---|---|
| 0 | Object | Plano | Infinity | | | |
| 1 | Lens 1 | 7.180500 (ASP) | 1.381 | Plastic | 1.507 | 49.27 |
| 2 | | 9.422300 (ASP) | 1.907 | ARTON-D4532 | | |
| 3 | Ape. Stop | Plano | 0.268 | | | |
| 4 | Lens 2 | −2.350870 (ASP) | 2.146 | Plastic | 1.507 | −8.50 |
| 5 | | −6.754000 (ASP) | 0.050 | ARTON-D4532 | | |
| 6 | Lens 3 | 2.595300 (ASP) | 2.500 | Plastic | 1.507 | 2.59 |
| 7 | | −1.798270 (ASP) | 0.161 | ARTON-D4532 | | |
| 8 | Lens 4 | −1.396580 (ASP) | 1.857 | Plastic | 1.571 | −4.41 |
| 9 | | −4.653800 (ASP) | 2.000 | PC | | |
| 10 | Filter | Plano | 0.300 | Glass | 1.510 | — |
| 11 | | Plano | 1.000 | HOYA-BSC7 | | |
| 12 | Cover-glass | Plano | 0.400 | Glass | 1.510 | — |
| 13 | | Plano | 2.045 | HOYA-BSC7 | | |
| 14 | Image | Plano | — | | | |

\* Reference wavelength for Focal length and Index calculation is 800.0 nm

TABLE 2

Aspheric Coefficients

| Surface # | 1 | 2 | 4 | 5 |
|---|---|---|---|---|
| k = | −6.11170E+00 | −9.90000E+01 | −5.54527E−01 | −2.26933E+00 |
| A4 = | 1.26874E−02 | 3.67922E−02 | 4.22817E−02 | −1.15197E−02 |
| A6 = | −1.38445E−04 | −5.26007E−03 | −2.07262E−02 | −1.14195E−03 |
| A8 = | 6.05008E−05 | 2.00562E−03 | 1.82483E−02 | −2.79449E−04 |
| A10 = | −4.82932E−07 | −2.40486E−04 | −1.99500E−02 | 5.97993E−05 |
| A12 = | | | 1.22144E−02 | 3.94351E−06 |
| A14 = | | | −3.02677E−03 | −2.03893E−06 |

| Surface # | 6 | 7 | 8 | 9 |
|---|---|---|---|---|
| k = | −1.44882E+00 | −2.35262E+00 | −1.57047E+00 | −7.33495E+00 |
| A4 = | −1.74803E−02 | 1.71266E−03 | 2.60600E−02 | 7.09552E−03 |
| A6 = | 3.02056E−03 | 2.26731E−03 | −3.32050E−03 | 5.51258E−04 |
| A8 = | −8.42074E−04 | −7.82895E−04 | 2.48366E−04 | −2.34101E−04 |
| A10 = | 6.37747E−05 | 8.60646E−05 | 7.65370E−06 | 1.29960E−05 |

In the first embodiment of the present optical lens system, the field of view of the optical lens system is FOV, and it satisfies the relation: FOV=44.2 deg.

In the first embodiment of the present optical lens system, an Abbe number of the first lens element 110 is V1, an Abbe number of the second lens element 120 is V2, and they satisfy the following relation: |V1−V2|=0.0.

In the first embodiment of the present optical lens system, an axial distance between the second lens element 120 and the third lens element 130 is T23, an axial distance between the third lens element 130 and the fourth lens element 140 is T34, a central thickness of the third lens element 130 is CT3, and they satisfy the following relation: (T23+T34)/CT3=0.08.

In the first embodiment of the present optical lens system, a curvature radius of the object-side surface 131 of the third lens element 130 is R5, the focal length of the optical lens system is f, and they satisfy the following relation: R5/f=0.37.

In the first embodiment of the present optical lens system, a curvature radius of the object-side surface 141 of the fourth lens element 140 is R7, the focal length of the optical lens system is f, and they satisfy the following relation: R7/f=−0.20.

In the first embodiment of the present optical lens system, the focal length of the optical lens system is f, a focal length of the first lens element 110 is f1, and they satisfy the following relation: f/f1=0.14.

In the first embodiment of the present optical lens system, a focal length of the fourth lens element 140 is f4, the focal length of the optical lens system is f, and they satisfy the following relation: f4/f=−0.64.

In the first embodiment of the present optical lens system, a composite focal length of the third lens element 130 and the fourth lens element 140 is f34, the focal length of the optical lens system is f, and they satisfy the following relation: f34/f=0.75.

In the first embodiment of the present optical lens system, a back focal length of the optical lens system is BFL, the central thickness of the third lens element 130 is CT3, and they satisfy the following relation: BFL/CT3=2.30.

In the first embodiment of the present optical lens system, an axial distance between the stop 100 and the image-side surface 142 of the fourth lens element 140 is SD, an axial distance between the object-side surface 111 of the first lens element 110 and the image-side surface 142 of the fourth lens element 140 is TD, and they satisfy the following relation: SD/TD=0.68.

In the first embodiment of the present optical lens system, a chief ray angle of the optical lens system is CRA, and it preferably satisfies the following relation: tan(CRA)=0.21.

Embodiment 2

Figure 2A:
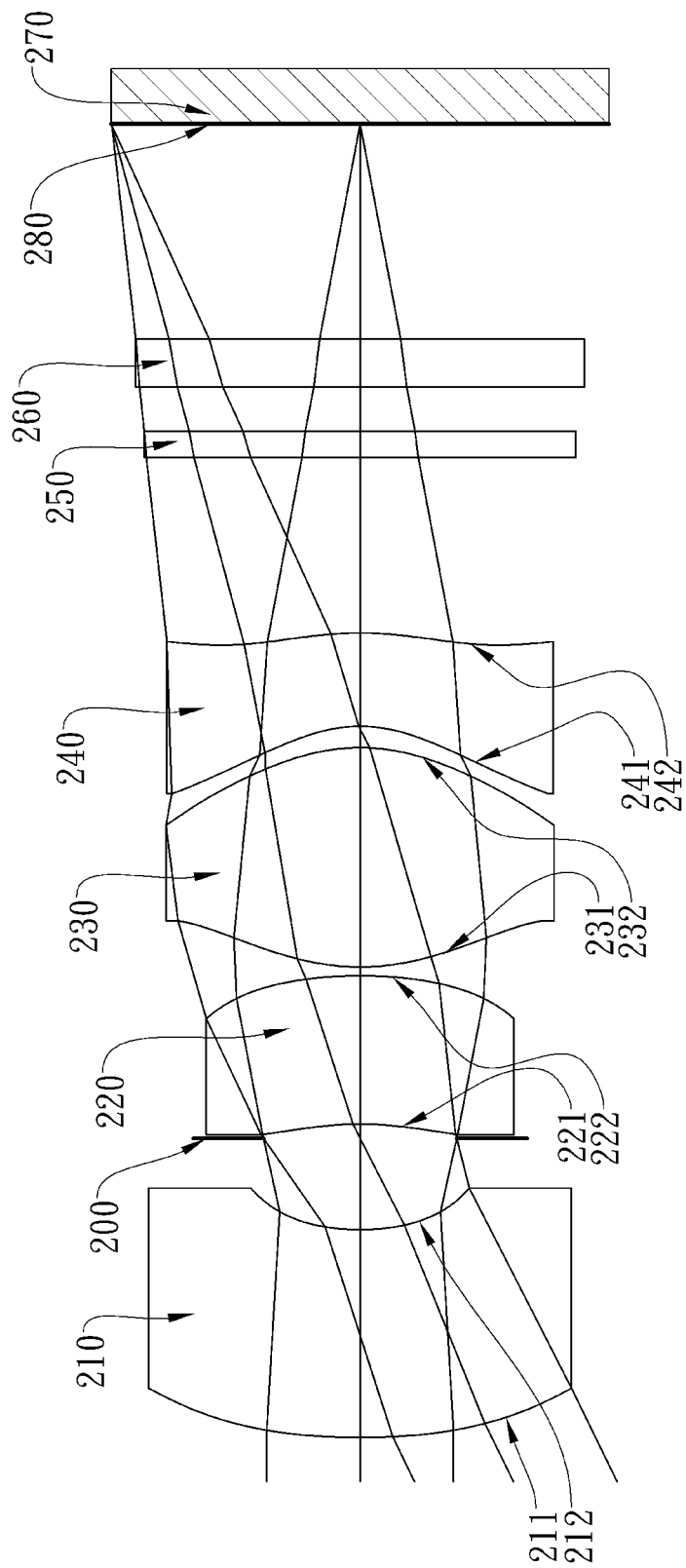
FIG. 2A shows an optical lens system in accordance with a second embodiment of the present invention.
Figure 2B:
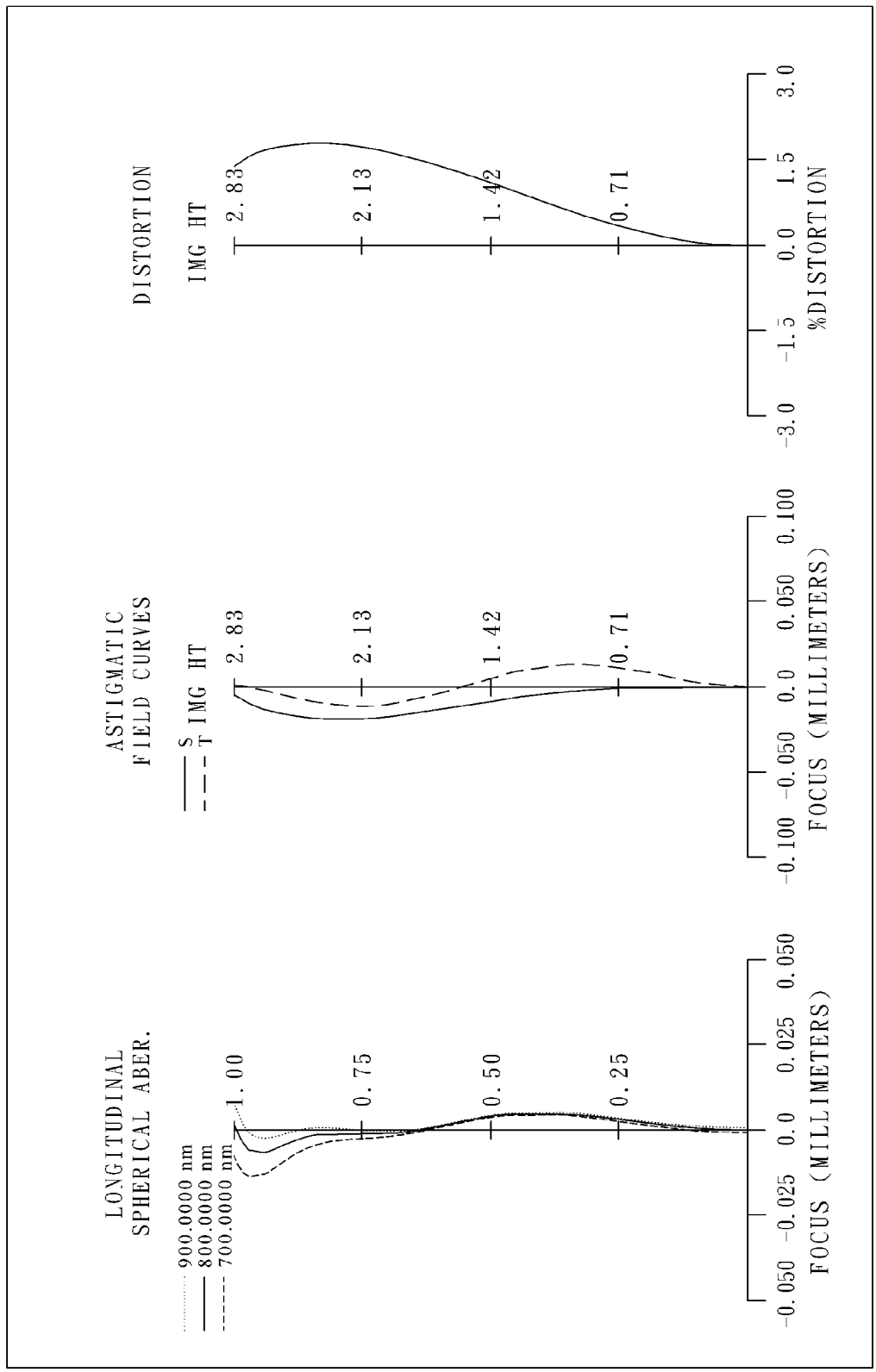
FIG. 2B shows the aberration curves of the second embodiment of the present invention.

FIG. 2A shows an optical lens system in accordance with the second embodiment of the present invention, and FIG. 2B shows the aberration curves of the second embodiment of the present invention. The optical lens system of the second embodiment of the present invention mainly comprises four lens elements, in order from an object side to an image side:

a plastic first lens element 210 with negative refractive power having a convex object-side surface 211 and a concave image-side surface 212, the object-side and image-side surfaces 211 and 212 thereof being aspheric;

a plastic second lens element 220 with negative refractive power having a concave object-side surface 221 and a convex image-side surface 222, the object-side and image-side surfaces 221 and 222 thereof being aspheric;

a plastic third lens element 230 with positive refractive power having a convex object-side surface 231 and a convex image-side surface 232, the object-side and image-side surfaces 231 and 232 thereof being aspheric; and a plastic fourth lens element 240 with negative refractive power having a concave object-side surface 241 and a convex image-side surface 242, the object-side and image-side surfaces 241 and 242 thereof being aspheric; wherein, the shape of the object-side surface 241 of the fourth lens element 240 changes from concave when near the optical axis to convex when away from the optical axis;

wherein an aperture stop 200 is disposed between the first lens element 210 and the second lens element 220;

the optical lens system further comprises a filter 250 disposed between the image-side surface 242 of the fourth lens element 240 and a cover glass 260; the filter 250 is an IR pass-filter made of glass and has no influence on the focal length of the optical lens system; the optical lens system further comprises an image sensor 270 provided on an image plane 280.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 5.74 mm, Fno = 2.70, HFOV = 26.0 deg.

| Surface # | | Curvature Radius | Thickness | Material | Index | Focal length |
|---|---|---|---|---|---|---|
| 0 | Object | Plano | Infinity | | | |
| 1 | Lens 1 | 7.500800 (ASP) | 2.369 | Plastic | 1.524 | −9.29 |
| 2 | | 2.630810 (ASP) | 1.041 | E48R25 | | |
| 3 | Ape. Stop | Plano | 0.161 | | | |
| 4 | Lens 2 | −3.608100 (ASP) | 1.690 | Plastic | 1.524 | −36.14 |
| 5 | | −5.175900 (ASP) | 0.100 | E48R25 | | |
| 6 | Lens 3 | 2.553170 (ASP) | 2.500 | Plastic | 1.524 | 2.75 |
| 7 | | −2.185600 (ASP) | 0.244 | E48R25 | | |
| 8 | Lens 4 | −1.593240 (ASP) | 1.062 | Plastic | 1.616 | −5.18 |
| 9 | | −3.995300 (ASP) | 2.000 | OKP4HT | | |
| 10 | Filter | Plano | 0.300 | Glass | 1.510 | — |
| 11 | | Plano | 0.500 | HOYA-BSC7 | | |
| 12 | Cover-glass | Plano | 0.550 | Glass | 1.510 | — |
| 13 | | Plano | 2.451 | HOYA-BSC7 | | |
| 14 | Image | Plano | — | | | |

* Reference wavelength for Focal length and Index calculation is 800.0 nm

TABLE 4

| Aspheric Coefficients | | | | |
|---|---|---|---|---|
| Surface # | 1 | 2 | 4 | 5 |
| k = | −6.05593E+00 | −6.42055E+00 | −6.75502E−01 | −7.85324E+00 |
| A4 = | 8.69184E−03 | 9.32657E−02 | 4.97678E−02 | −1.76382E−02 |
| A6 = | −4.42007E−04 | −5.64444E−03 | −1.99467E−02 | −3.45383E−03 |
| A8 = | 2.57541E−05 | 6.79312E−03 | 1.94802E−02 | 1.90180E−03 |
| A10 = | −2.64866E−06 | −2.95100E−04 | −2.05296E−02 | −1.07580E−03 |
| A12 = | | | 1.22684E−02 | 2.81804E−04 |
| A14 = | | | −2.95526E−03 | −3.06855E−05 |
| Surface # | 6 | 7 | 8 | 9 |
| k = | −1.33578E+00 | −2.68525E+00 | −1.97141E+00 | −7.61229E+00 |
| A4 = | −1.73398E−02 | −1.82812E−03 | 2.77164E−02 | 2.02439E−02 |
| A6 = | 2.71893E−03 | 1.46483E−03 | −3.73850E−03 | 6.02738E−03 |
| A8 = | −6.60107E−04 | −5.47915E−04 | 1.11870E−04 | −4.77163E−04 |
| A10 = | 3.91233E−05 | 5.14116E−05 | 2.67559E−05 | 1.52650E−05 |
| A12 = | | | −1.44567E−06 | 1.90910E−06 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5; wherein the unit of FOV is expressed in degree (deg.).

TABLE 5

| (Embodiment 2) | |
|---|---|
| f [mm] | 5.74 |
| Fno | 2.70 |
| FOV [deg.] | 52.0 |
| |V1 − V2| | 0.0 |
| (T23 + T34)/CT3 | 0.14 |
| R5/f | 0.44 |
| R7/f | −0.28 |
| f/f1 | −0.62 |
| f4/f | −0.90 |
| f34/f | 0.81 |
| BFL/CT3 | 2.32 |
| SD/TD | 0.63 |
| tan(CRA) | 0.27 |

Embodiment 3

Figure 3A:
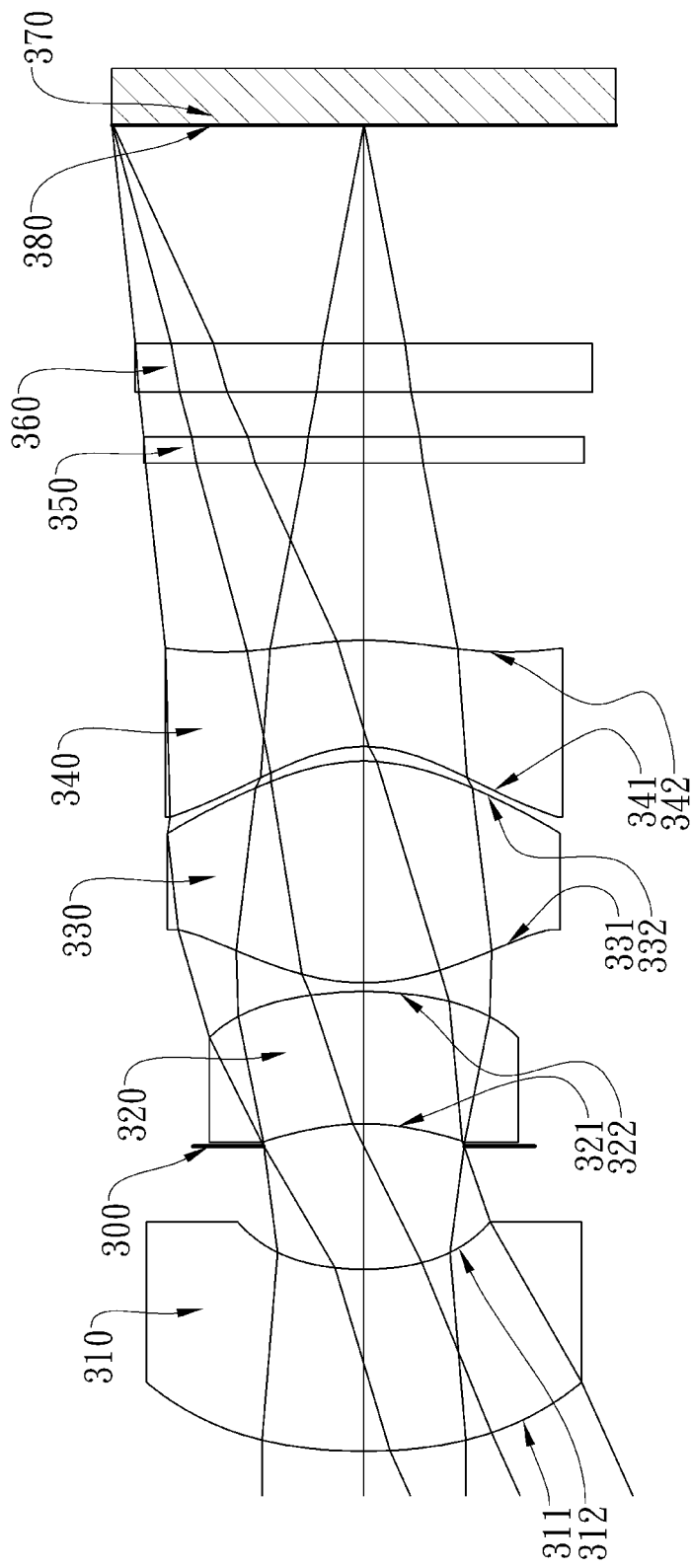
FIG. 3A shows an optical lens system in accordance with a third embodiment of the present invention.
Figure 3B:
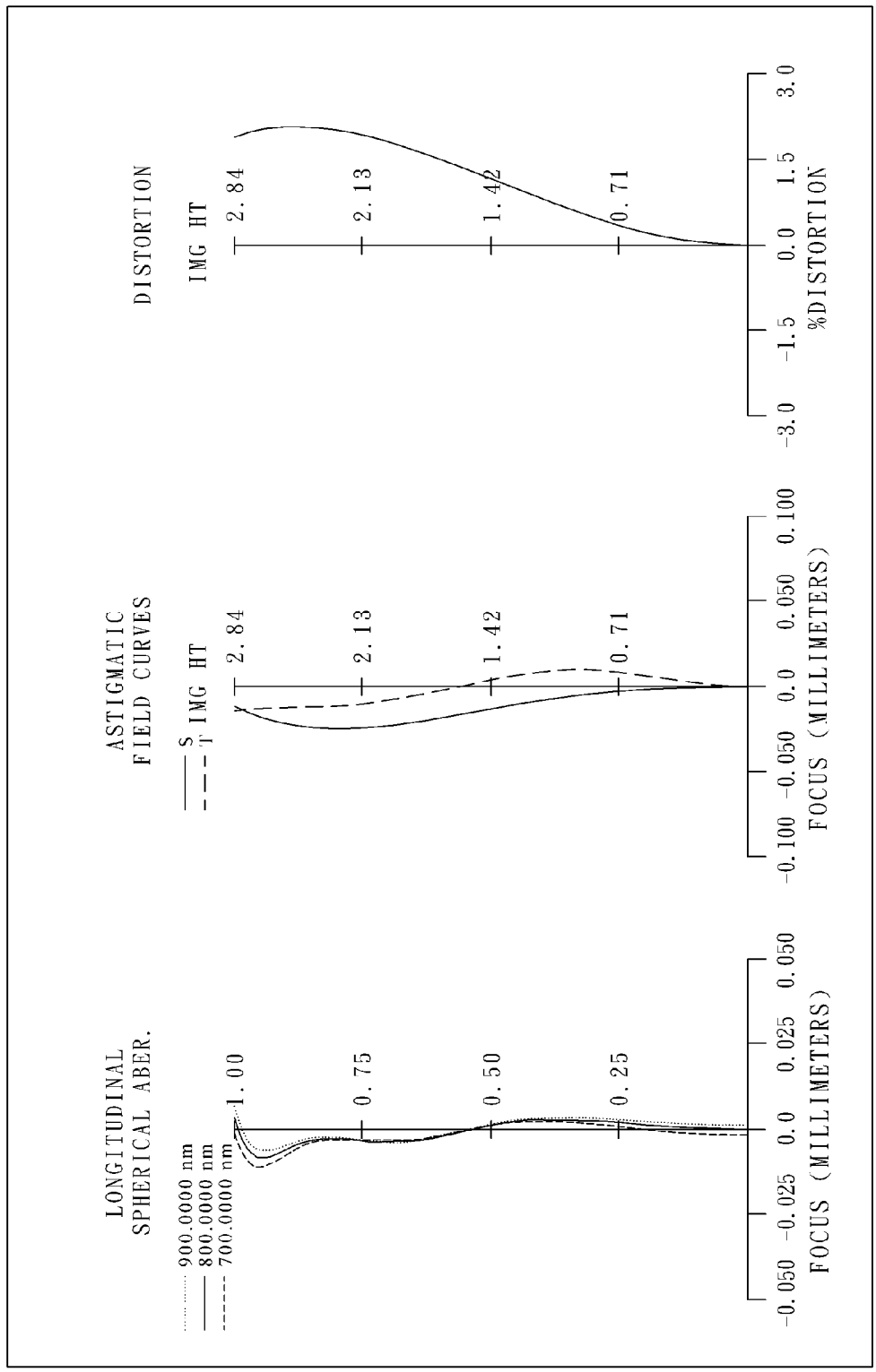
FIG. 3B shows the aberration curves of the third embodiment of the present invention.

FIG. 3A shows an optical lens system in accordance with the third embodiment of the present invention, and FIG. 3B shows the aberration curves of the third embodiment of the present invention. The optical lens system of the third embodiment of the present invention mainly comprises four lens elements, in order from an object side to an image side:

a plastic first lens element 310 with negative refractive power having a convex object-side surface 311 and a concave image-side surface 312, the object-side and image-side surfaces 311 and 312 thereof being aspheric;

a plastic second lens element 320 with negative refractive power having a concave object-side surface 321 and a convex image-side surface 322, the object-side and image-side surfaces 321 and 322 thereof being aspheric;

a plastic third lens element 330 with positive refractive power having a convex object-side surface 331 and a convex image-side surface 332, the object-side and image-side surfaces 331 and 332 thereof being aspheric; and a plastic fourth lens element 340 with negative refractive power having a concave object-side surface 341 and a convex image-side surface 342, the object-side and image-side surfaces 341 and 342 thereof being aspheric; wherein, the shape of the object-side surface 341 of the fourth lens element 340 changes from concave when near the optical axis to convex when away from the optical axis;

wherein an aperture stop 300 is disposed between the first lens element 310 and the second lens element 320;

the optical lens system further comprises a filter 350 disposed between the image-side surface 342 of the fourth lens element 340 and a cover glass 360; the filter 350 is an IR pass-filter made of glass and has no influence on the focal length of the optical lens system; the optical lens system further comprises an image sensor 370 provided on an image plane 380.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)
f = 6.19 mm, Fno = 2.70, HFOV = 24.2 deg.

| Surface # | | Curvature Radius | Thickness | Material | Index | Focal length |
|---|---|---|---|---|---|---|
| 0 | Object | Plano | Infinity | | | |
| 1 | Lens 1 | 5.807600 (ASP) | 2.052 | Plastic | 1.524 | −16.86 |
| 2 | | 3.077900 (ASP) | 1.391 | E48R25 | | |
| 3 | Ape. Stop | Plano | 0.252 | | | |
| 4 | Lens 2 | −2.587580 (ASP) | 1.490 | Plastic | 1.524 | −14.44 |
| 5 | | −4.712900 (ASP) | 0.100 | E48R25 | | |
| 6 | Lens 3 | 2.372850 (ASP) | 2.500 | Plastic | 1.524 | 2.67 |
| 7 | | −2.174970 (ASP) | 0.165 | E48R25 | | |

TABLE 6-continued (Embodiment 3)
f = 6.19 mm, Fno = 2.70, HFOV = 24.2 deg.

| Surface # | | Curvature Radius | Thickness | Material | Index | Focal length |
|---|---|---|---|---|---|---|
| 8 | Lens 4 | −1.566320 (ASP) | 1.197 | Plastic | 1.593 | −4.87 |
| 9 | | −4.402500 (ASP) | 2.000 | SD1414 | | |
| 10 | Filter | Plano | 0.300 | Glass | 1.510 | — |
| 11 | | Plano | 0.500 | HOYA-BSC7 | | |
| 12 | Cover-glass | Plano | 0.550 | Glass | 1.510 | — |
| 13 | | Plano | 2.463 | HOYA-BSC7 | | |
| 14 | Image | Plano | — | | | |

\* Reference wavelength for Focal length and Index calculation is 800.0 nm

TABLE 7

Aspheric Coefficients

| Surface # | 1 | 2 | 4 | 5 |
|---|---|---|---|---|
| k = | −4.95546E+00 | −1.00000E+01 | −1.04599E+00 | −1.00000E+01 |
| A4 = | 1.02174E−02 | 7.63173E−02 | 4.88759E−02 | −1.92121E−02 |
| A6 = | −3.01884E−04 | −1.21387E−02 | −2.79226E−02 | −4.16144E−03 |
| A8 = | 3.74596E−05 | 6.85397E−03 | 2.18581E−02 | 2.04234E−03 |
| A10 = | −2.77836E−06 | −1.00465E−03 | −2.15092E−02 | −1.06590E−03 |
| A12 = | | | 1.22684E−02 | 2.67127E−04 |
| A14 = | | | −2.95526E−03 | −3.09590E−05 |

| Surface # | 6 | 7 | 8 | 9 |
|---|---|---|---|---|
| k = | −1.44780E+00 | −2.46197E+00 | −1.82791E+00 | −9.23184E+00 |
| A4 = | −1.71590E−02 | 2.34147E−03 | 2.70212E−02 | 1.70206E−02 |
| A6 = | 3.20644E−03 | 1.87373E−03 | −3.11978E−03 | 6.56230E−04 |
| A8 = | −6.81810E−04 | −6.24308E−04 | 1.89407E−04 | −4.13177E−04 |
| A10 = | 3.41723E−05 | 4.95997E−05 | −2.10725E−06 | 2.38842E−05 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8; wherein the unit of FOV is expressed in degree (deg.).

TABLE 8

(Embodiment 3)

| | |
|---|---|
| f [mm] | 6.19 |
| Fno | 2.70 |
| FOV [deg.] | 48.4 |
| \|V1 − V2\| | 0.0 |
| (T23 + T34)/CT3 | 0.11 |
| R5/f | 0.38 |
| R7/f | −0.25 |
| f/f1 | −0.37 |
| f4/f | −0.79 |
| f34/f | 0.74 |
| BFL/CT3 | 2.33 |
| SD/TD | 0.62 |
| tan(CRA) | 0.27 |

Embodiment 4

Figure 4A:
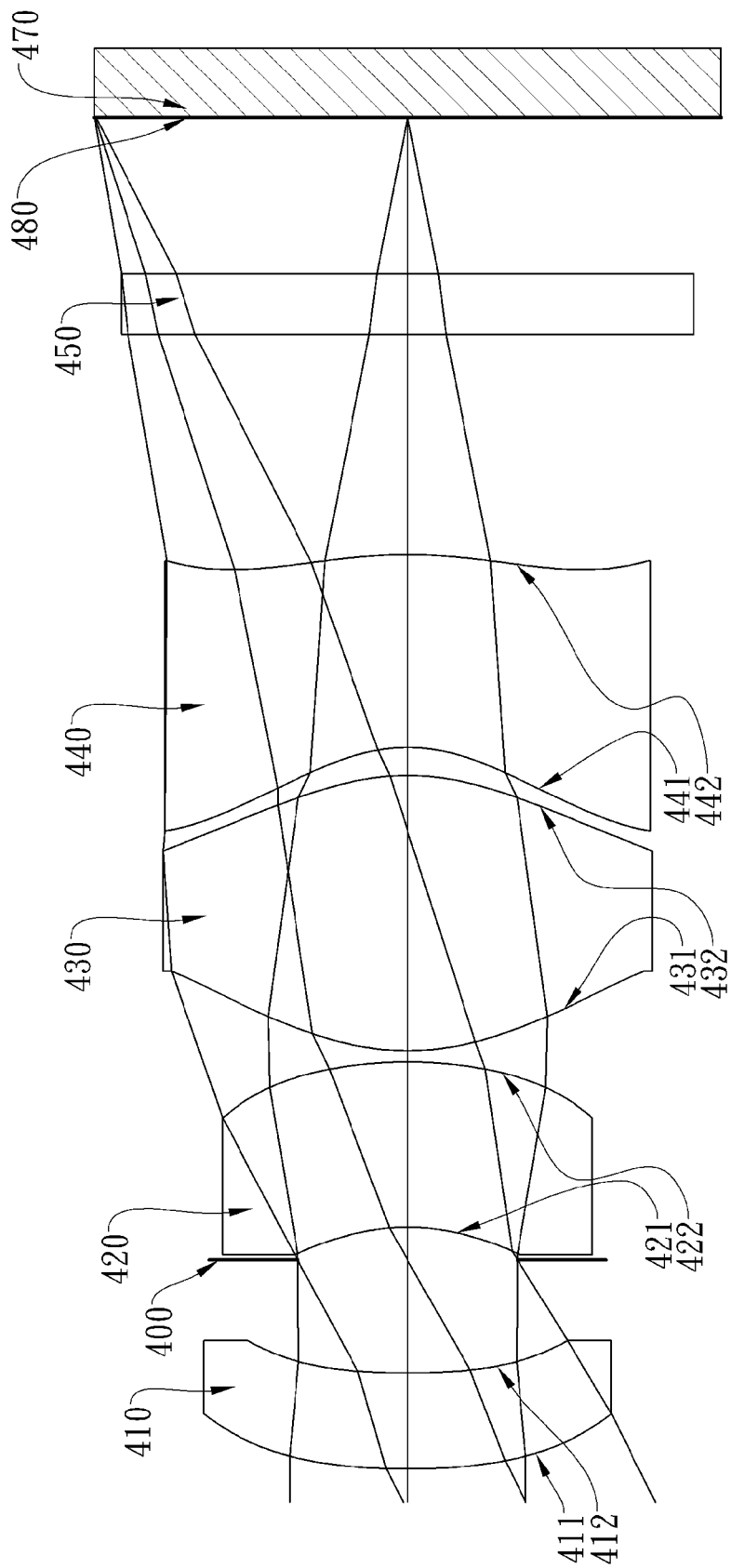
FIG. 4A shows an optical lens system in accordance with a fourth embodiment of the present invention.
Figure 4B:
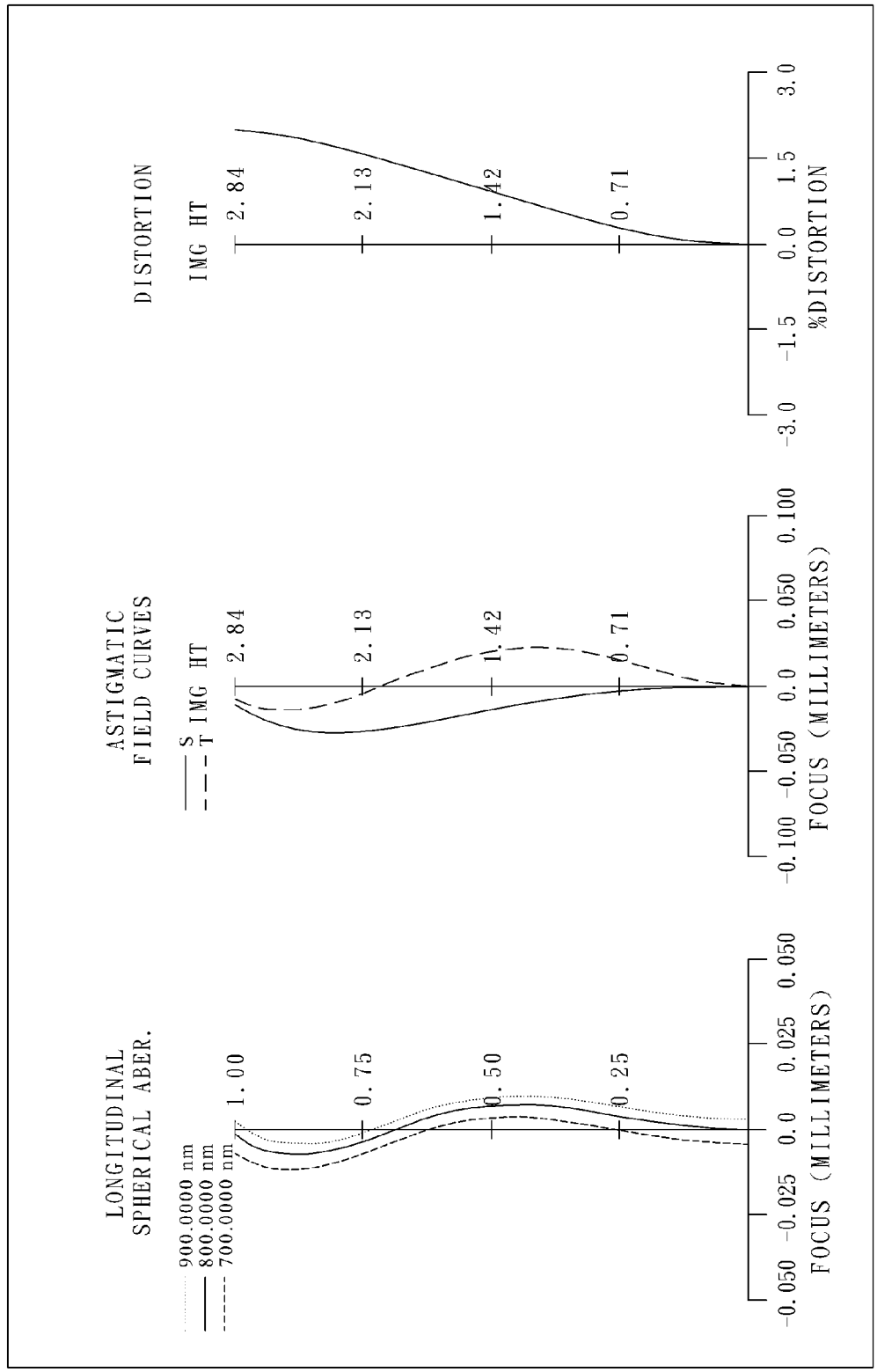
FIG. 4B shows the aberration curves of the fourth embodiment of the present invention.

FIG. 4A shows an optical lens system in accordance with the fourth embodiment of the present invention, and FIG. 4B shows the aberration curves of the fourth embodiment of the present invention. The optical lens system of the fourth embodiment of the present invention mainly comprises four lens elements, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a concave object-side surface 421 and a convex image-side surface 422, the object-side and image-side surfaces 421 and 422 thereof being aspheric;

a plastic third lens element 430 with positive refractive power having a convex object-side surface 431 and a convex image-side surface 432, the object-side and image-side surfaces 431 and 432 thereof being aspheric; and a plastic fourth lens element 440 with negative refractive power having a concave object-side surface 441 and a convex image-side surface 442, the object-side and image-side surfaces 441 and 442 thereof being aspheric; wherein, the shape of the object-side surface 441 of the fourth lens element 440 changes from concave when near the optical axis to convex when away from the optical axis;

wherein an aperture stop 400 is disposed between the first lens element 410 and the second lens element 420;

the optical lens system further comprises a filter 450 disposed between the image-side surface 442 of the fourth lens element 440 and an image plane 480; the filter 450 is an IR pass-filter made of glass and has no influence on the focal length of the optical lens system; the optical lens system further comprises an image sensor 470 provided on the image plane 480.

The detailed optical data of the fourth embodiment is shown in TABLE 9, and the aspheric surface data is shown in TABLE 10 wherein the units of the curvature radius, the thickness and the focal length are expressed in mm, and HFOV is half of the maximal field of view.

TABLE 9

(Embodiment 4)
f = 5.56 mm, Fno = 2.60, HFOV = 26.6 deg.

| Surface # | | Curvature Radius | Thickness | Material | Index | Focal length |
|---|---|---|---|---|---|---|
| 0 | Object | Plano | Infinity | | | |
| 1 | Lens 1 | 6.032600 (ASP) | 0.870 | Plastic | 1.537 | 66.97 |
| 2 | | 6.881800 (ASP) | 1.028 | APEL-5514ML | | |
| 3 | Ape. Stop | Plano | 0.299 | | | |
| 4 | Lens 2 | −1.869190 (ASP) | 1.500 | Plastic | 1.537 | −8.96 |
| 5 | | −3.913100 (ASP) | 0.100 | APEL-5514ML | | |
| 6 | Lens 3 | 2.273310 (ASP) | 2.500 | Plastic | 1.537 | 2.57 |
| 7 | | −2.162670 (ASP) | 0.254 | APEL-5514ML | | |
| 8 | Lens 4 | −1.485220 (ASP) | 1.752 | Plastic | 1.617 | −4.65 |
| 9 | | −4.467100 (ASP) | 2.000 | EP5000 | | |
| 10 | Filter | Plano | 0.550 | Glass | 1.510 | — |
| 11 | | Plano | 1.418 | HOYA-BSC7 | | |
| 12 | Image | Plano | — | | | |

* Reference wavelength for Focal length and Index calculation is 800.0 nm

TABLE 10

Aspheric Coefficients

| Surface # | 1 | 2 | 4 | 5 |
|---|---|---|---|---|
| k = | −1.00000E+00 | −1.00000E+01 | −1.00535E+00 | −6.75526E+00 |
| A4 = | 1.78324E−02 | 3.82209E−02 | 5.16948E−02 | −1.81610E−02 |
| A6 = | −2.77198E−04 | −3.23085E−03 | −4.23720E−02 | −5.14452E−03 |
| A8 = | 3.29023E−04 | 3.79112E−03 | 3.07797E−02 | 2.32904E−03 |
| A10 = | −4.88075E−05 | −1.35041E−03 | −2.54888E−02 | −1.04853E−03 |
| A12 = | | | 1.22684E−02 | 2.31955E−04 |
| A14 = | | | −2.95526E−03 | −2.47721E−05 |

| Surface # | 6 | 7 | 8 | 9 |
|---|---|---|---|---|
| k = | −1.37280E+00 | −3.01240E+00 | −1.90063E+00 | −7.27942E+00 |
| A4 = | −1.61955E−02 | 4.95083E−03 | 2.75789E−02 | 1.48217E−02 |
| A6 = | 3.58924E−03 | 1.98620E−03 | −2.92114E−03 | 1.15813E−03 |
| A8 = | −6.47963E−04 | −6.25840E−04 | 2.17700E−04 | −2.40348E−04 |
| A10 = | 3.14972E−05 | 5.14454E−05 | 1.54204E−06 | 7.97357E−06 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11; wherein the unit of FOV is expressed in degree (deg.).

TABLE 11

(Embodiment 4)

| f [mm] | 5.56 |
|---|---|
| Fno | 2.60 |
| FOV [deg.] | 53.2 |
| |V1 − V2| | 0.0 |
| (T23 + T34)/CT3 | 0.14 |
| R5/f | 0.41 |
| R7/f | −0.27 |
| f/f1 | 0.08 |
| f4/f | −0.84 |
| f34/f | 0.82 |
| BFL/CT3 | 1.59 |
| SD/TD | 0.77 |
| tan(CRA) | 0.32 |

Embodiment 5

Figure 5A:
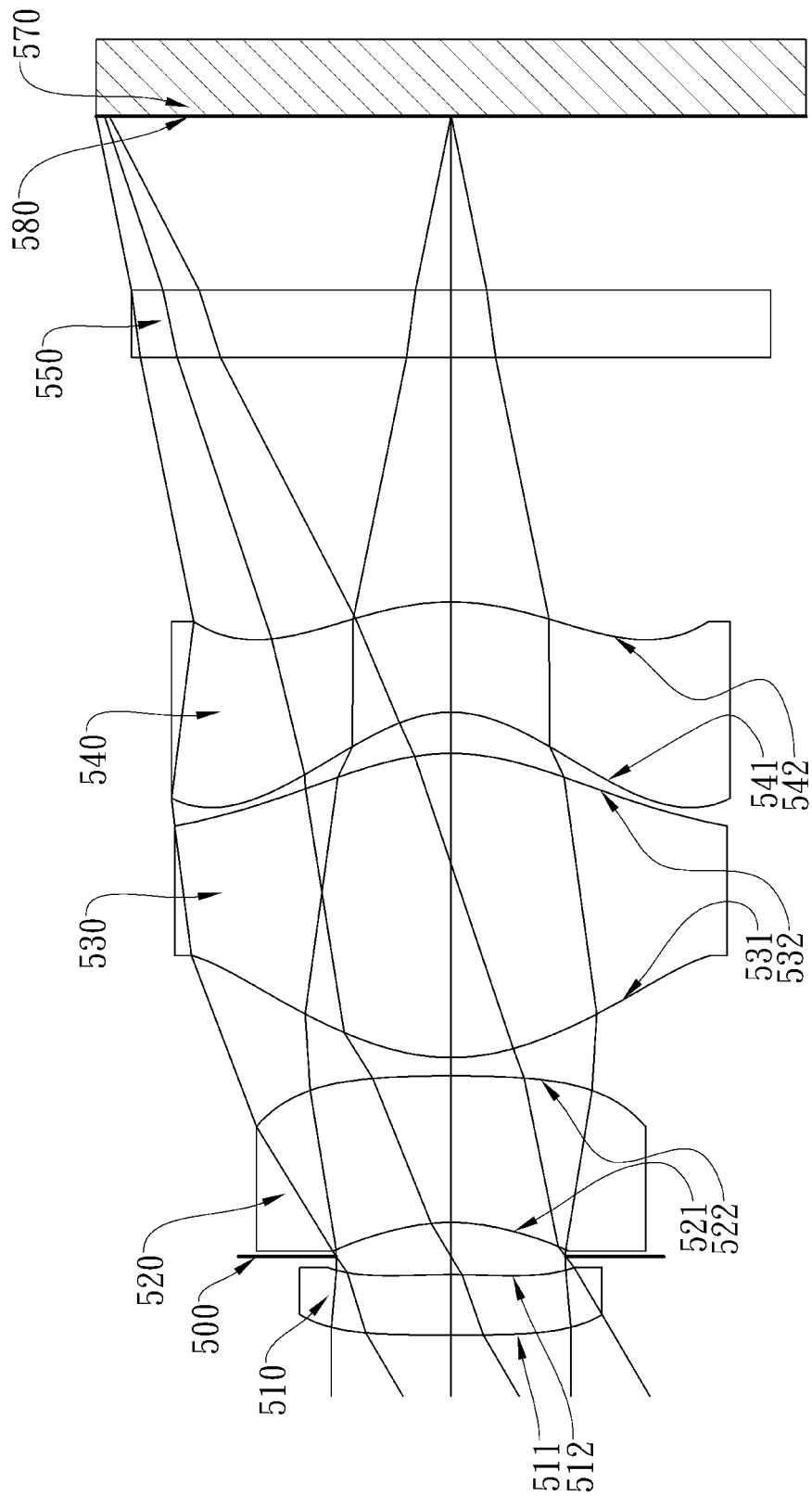
FIG. 5A shows an optical lens system in accordance with a fifth embodiment of the present invention.
Figure 5B:
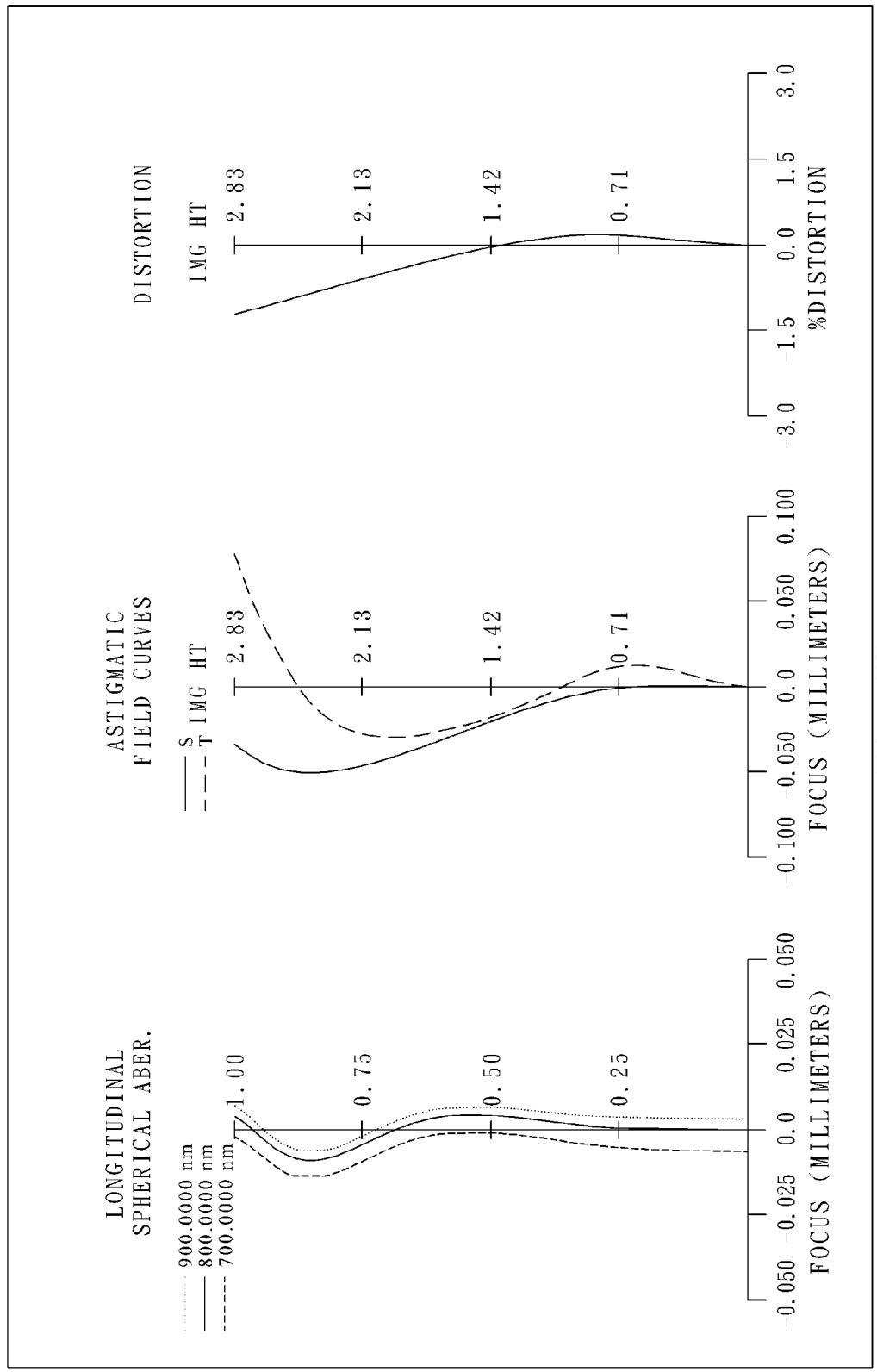
FIG. 5B shows the aberration curves of the fifth embodiment of the present invention.

FIG. 5A shows an optical lens system in accordance with the fifth embodiment of the present invention, and FIG. 5B shows the aberration curves of the fifth embodiment of the present invention. The optical lens system of the fifth embodiment of the present invention mainly comprises four lens elements, in order from an object side to an image side:

a plastic first lens element 510 with positive refractive power having a convex object-side surface 511 and a convex image-side surface 512, the object-side and image-side surfaces 511 and 512 thereof being aspheric;

a plastic second lens element 520 with negative refractive power having a concave object-side surface 521 and a convex image-side surface 522, the object-side and image-side surfaces 521 and 522 thereof being aspheric;

a plastic third lens element 530 with positive refractive power having a convex object-side surface 531 and a convex image-side surface 532, the object-side and image-side surfaces 531 and 532 thereof being aspheric; and a plastic fourth lens element 540 with negative refractive power having a concave object-side surface 541 and a convex image-side surface 542, the object-side and image-side surfaces 541 and 542 thereof being aspheric; wherein, the shape of the object-side surface 541 of the fourth lens element 540 changes from concave when near the optical axis to convex when away from the optical axis;

wherein an aperture stop 500 is disposed between the first lens element 510 and the second lens element 520;

the optical lens system further comprises a filter 550 disposed between the image-side surface 542 of the fourth lens element 540 and an image plane 580; the filter 550 is an IR pass-filter made of glass and has no influence on the focal length of the optical lens system; the optical lens system further comprises an image sensor 570 provided on the image plane 580.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)
f = 4.89 mm, Fno = 2.50, HFOV = 30.4 deg.

| Surface # | | Curvature Radius | Thickness | Material | Index | Focal length |
|---|---|---|---|---|---|---|
| 0 | Object | Plano | Infinity | | | |
| 1 | Lens 1 | 67.294800 (ASP) | 0.493 | Plastic | 1.537 | 13.68 |
| 2 | | −8.232300 (ASP) | 0.150 | APEL-5514ML | | |
| 3 | Ape. Stop | Plano | 0.279 | | | |
| 4 | Lens 2 | −1.579540 (ASP) | 1.199 | Plastic | 1.537 | −3.56 |
| 5 | | −11.449900 (ASP) | 0.150 | APEL-5514ML | | |
| 6 | Lens 3 | 1.679470 (ASP) | 2.489 | Plastic | 1.537 | 2.17 |
| 7 | | −1.837030 (ASP) | 0.337 | APEL-5514ML | | |
| 8 | Lens 4 | −0.958640 (ASP) | 0.903 | Plastic | 1.622 | −4.63 |
| 9 | | −1.956600 (ASP) | 2.000 | SP3810 | | |
| 10 | Filter | Plano | 0.550 | Glass | 1.510 | — |
| 11 | | Plano | 1.425 | HOYA-BSC7 | | |
| 12 | Image | Plano | — | | | |

* Reference wavelength for Focal length and Index calculation is 800.0 nm

TABLE 13

Aspheric Coefficients

| Surface # | 1 | 2 | 4 | 5 |
|---|---|---|---|---|
| k = | −1.00000E+00 | −1.00000E+01 | −3.63508E+00 | −7.70917E+00 |
| A4 = | 5.79512E−02 | 1.25500E−01 | 7.53775E−02 | −1.33309E−02 |
| A6 = | 8.74987E−03 | −2.21545E−02 | −1.16018E−01 | −2.56860E−02 |
| A8 = | −1.01548E−02 | 1.38117E−02 | 8.56097E−02 | 9.41193E−03 |
| A10 = | 5.37865E−03 | −1.51698E−03 | −4.77544E−02 | −1.91802E−03 |
| A12 = | | | 1.22686E−02 | 8.09642E−05 |
| A14 = | | | −2.95524E−03 | −2.09310E−05 |

| Surface # | 6 | 7 | 8 | 9 |
|---|---|---|---|---|
| k = | −2.58719E+00 | −3.66408E+00 | −2.01196E+00 | −3.12498E+00 |
| A4 = | −7.68805E−03 | 1.07487E−02 | 3.29011E−02 | 2.75782E−02 |
| A6 = | 5.48246E−03 | 2.44175E−03 | −1.90408E−03 | 1.37459E−03 |
| A8 = | −1.42556E−03 | −8.92276E−04 | 3.73289E−04 | 2.47918E−05 |
| A10 = | 7.84866E−05 | 7.64393E−05 | −2.39258E−05 | −2.37401E−05 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14; wherein the unit of FOV is expressed in degree (deg.).

TABLE 14

(Embodiment 5)

| f [mm] | 4.89 |
|---|---|
| Fno | 2.50 |
| FOV [deg.] | 60.8 |
| |V1 − V2| | 0.0 |
| (T23 + T34)/CT3 | 0.20 |
| R5/f | 0.34 |

TABLE 14-continued (Embodiment 5)

| R7/f | −0.20 |
|---|---|
| f/f1 | 0.36 |
| f4/f | −0.95 |
| f34/f | 0.66 |

TABLE 14-continued (Embodiment 5)

| | |
|---|---|
| BFL/CT3 | 1.60 |
| SD/TD | 0.89 |
| tan(CRA) | 0.33 |

Embodiment 6

Figure 6A:
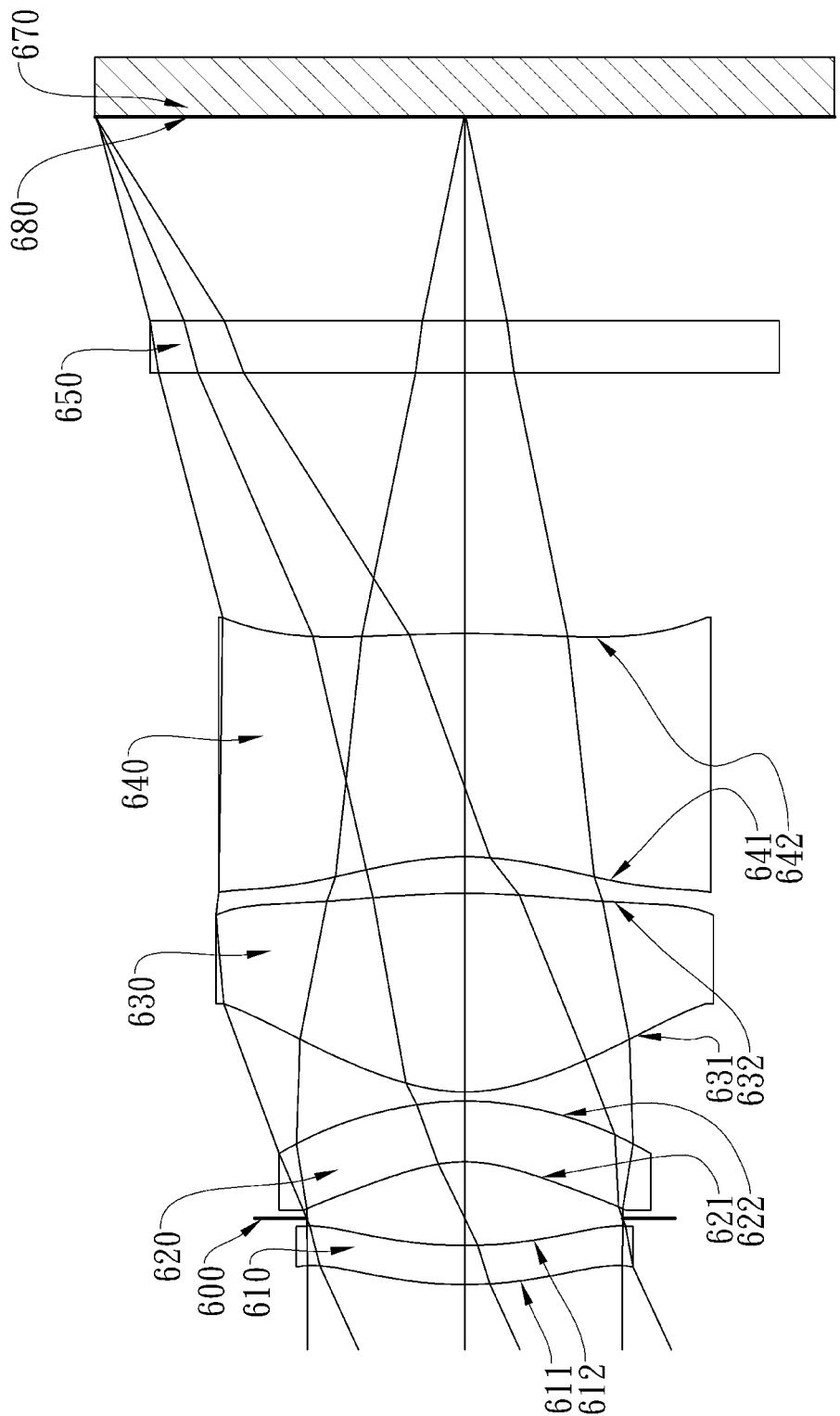
FIG. 6A shows an optical lens system in accordance with a sixth embodiment of the present invention.
Figure 6B:
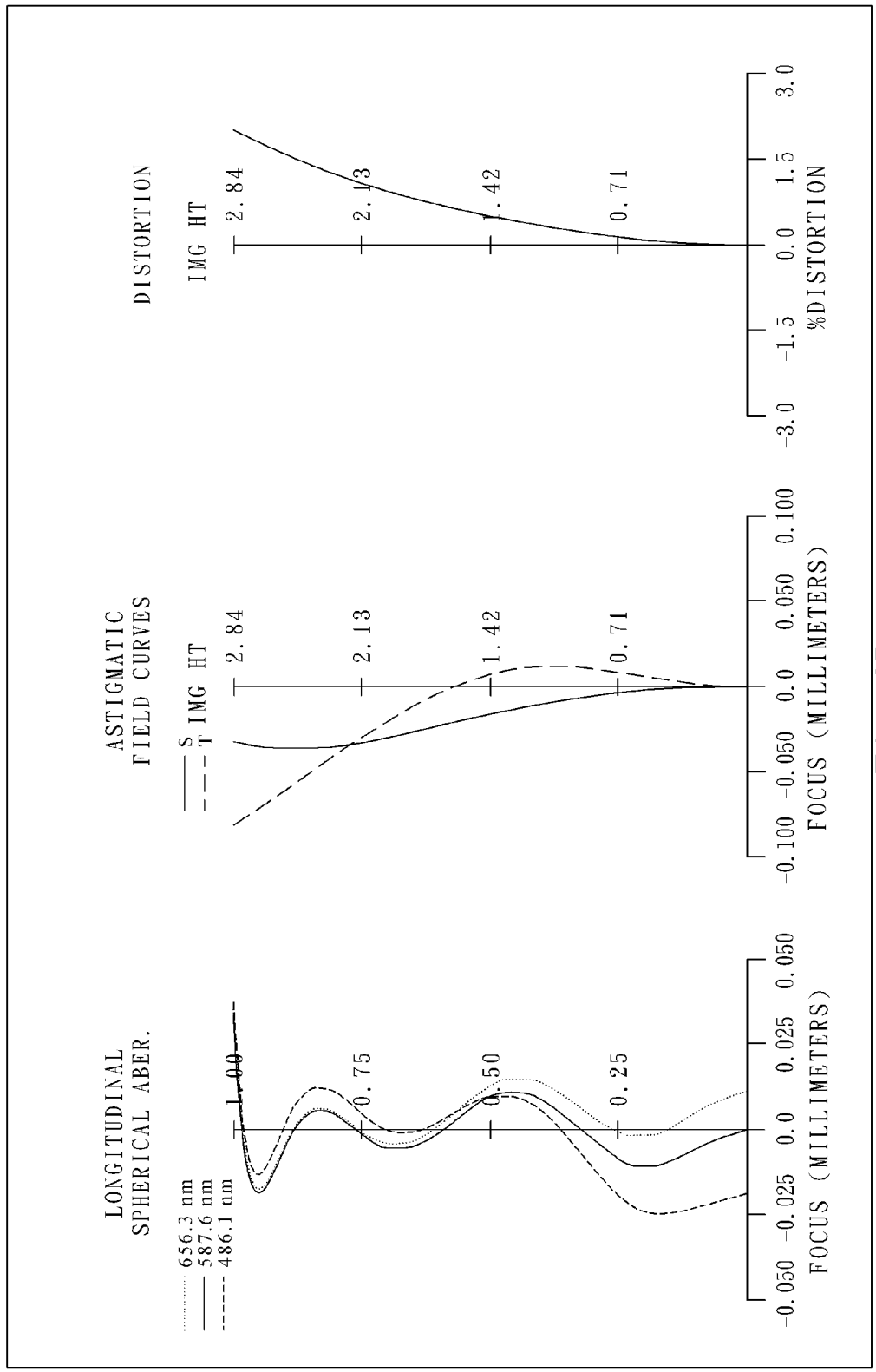
FIG. 6B shows the aberration curves of the sixth embodiment of the present invention.

FIG. 6A shows an optical lens system in accordance with the sixth embodiment of the present invention, and FIG. 6B shows the aberration curves of the sixth embodiment of the present invention. The optical lens system of the sixth embodiment of the present invention mainly comprises four lens elements, in order from an object side to an image side:

a plastic first lens element 610 with positive refractive power having a convex object-side surface 611 and a concave image-side surface 612, the object-side and image-side surfaces 611 and 612 thereof being aspheric;

a plastic second lens element 620 with negative refractive power having a concave object-side surface 621 and a convex image-side surface 622, the object-side and image-side surfaces 621 and 622 thereof being aspheric;

a plastic third lens element 630 with positive refractive power having a convex object-side surface 631 and a convex image-side surface 632, the object-side and image-side surfaces 631 and 632 thereof being aspheric; and a plastic fourth lens element 640 with negative refractive power having a concave object-side surface 641 and a convex image-side surface 642, the object-side and image-side surfaces 641 and 642 thereof being aspheric; wherein, the shape of the object-side surface 641 of the fourth lens element 640 changes from concave when near the optical axis to convex when away from the optical axis;

wherein an aperture stop 600 is disposed between the first lens element 610 and the second lens element 620;

the optical lens system further comprises a filter 650 disposed between the image-side surface 642 of the fourth lens element 640 and an image plane 680; the filter 650 is an IR cut-filter made of glass and has no influence on the focal length of the optical lens system; the optical lens system further comprises an image sensor 670 provided on the image plane 680.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 6)
f = 6.03 mm, Fno = 2.50, HFOV = 24.7 deg.

| Surface # | | Curvature Radius | Thickness | Material | Index | Focal length |
|---|---|---|---|---|---|---|
| 0 | Object | Plano | Infinity | | | |
| 1 | Lens 1 | 3.069600 (ASP) | 0.300 | Plastic | 1.544 | 47.53 |
| 2 | | 3.363000 (ASP) | 0.207 | APEL-5514ML | | |
| 3 | Ape. Stop | Plano | 0.435 | | | |
| 4 | Lens 2 | −1.118250 (ASP) | 0.467 | Plastic | 1.544 | −4.76 |
| 5 | | −2.256040 (ASP) | 0.070 | APEL-5514ML | | |
| 6 | Lens 3 | 1.395540 (ASP) | 1.524 | Plastic | 1.544 | 2.26 |
| 7 | | −6.398800 (ASP) | 0.280 | APEL-5514ML | | |
| 8 | Lens 4 | −2.479120 (ASP) | 1.714 | Plastic | 1.640 | −5.77 |
| 9 | | −9.579500 (ASP) | 2.000 | SP3810 | | |
| 10 | Filter | Plano | 0.400 | Glass | 1.510 | — |
| 11 | | Plano | 1.567 | HOYA-BSC7 | | |
| 12 | Image | Plano | — | | | |

* Reference wavelength for Focal length and Index calculation is 587.6 nm

TABLE 16

Aspheric Coefficients

| Surface # | 1 | 2 | 4 | 5 |
|---|---|---|---|---|
| k = | −6.25644E+00 | −1.00000E+01 | −5.30569E+00 | −9.71601E+00 |
| A4 = | 2.76923E−03 | 2.47934E−02 | 3.34829E−02 | −1.45729E−02 |
| A6 = | −9.62760E−03 | −1.95494E−02 | −3.76151E−02 | −2.82711E−02 |
| A8 = | −7.71492E−03 | 1.39003E−03 | 3.59165E−02 | 2.22065E−02 |
| A10 = | 3.33670E−04 | −3.63123E−03 | −2.64029E−02 | −8.83879E−03 |
| A12 = | | | 1.22686E−02 | 1.62802E−03 |
| A14 = | | | −2.95524E−03 | −2.09311E−05 |

| Surface # | 6 | 7 | 8 | 9 |
|---|---|---|---|---|
| k = | −4.94664E+00 | −1.00000E+00 | −3.33701E+00 | −1.00000E+00 |
| A4 = | 2.27767E−02 | 2.08120E−02 | 2.93802E−02 | 2.64225E−02 |
| A6 = | −8.01320E−03 | 2.93582E−03 | 2.48592E−03 | 2.35092E−04 |
| A8 = | 9.62840E−04 | −2.07874E−03 | −1.17663E−03 | 8.60373E−06 |
| A10 = | −9.05827E−05 | 1.01690E−04 | 2.43582E−06 | −4.13669E−05 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17; wherein the unit of FOV is expressed in degree (deg.).

TABLE 17

(Embodiment 6)

| | |
|---|---|
| f [mm] | 6.03 |
| Fno | 2.50 |
| FOV [deg.] | 49.4 |
| |V1 − V2| | 0.0 |
| (T23 + T34)/CT3 | 0.23 |
| R5/f | 0.23 |
| R7/f | −0.41 |
| f/f1 | 0.13 |
| f4/f | −0.96 |
| f34/f | 0.51 |
| BFL/CT3 | 2.60 |
| SD/TD | 0.90 |
| tan(CRA) | 0.43 |

Embodiment 7

Figure 7A:
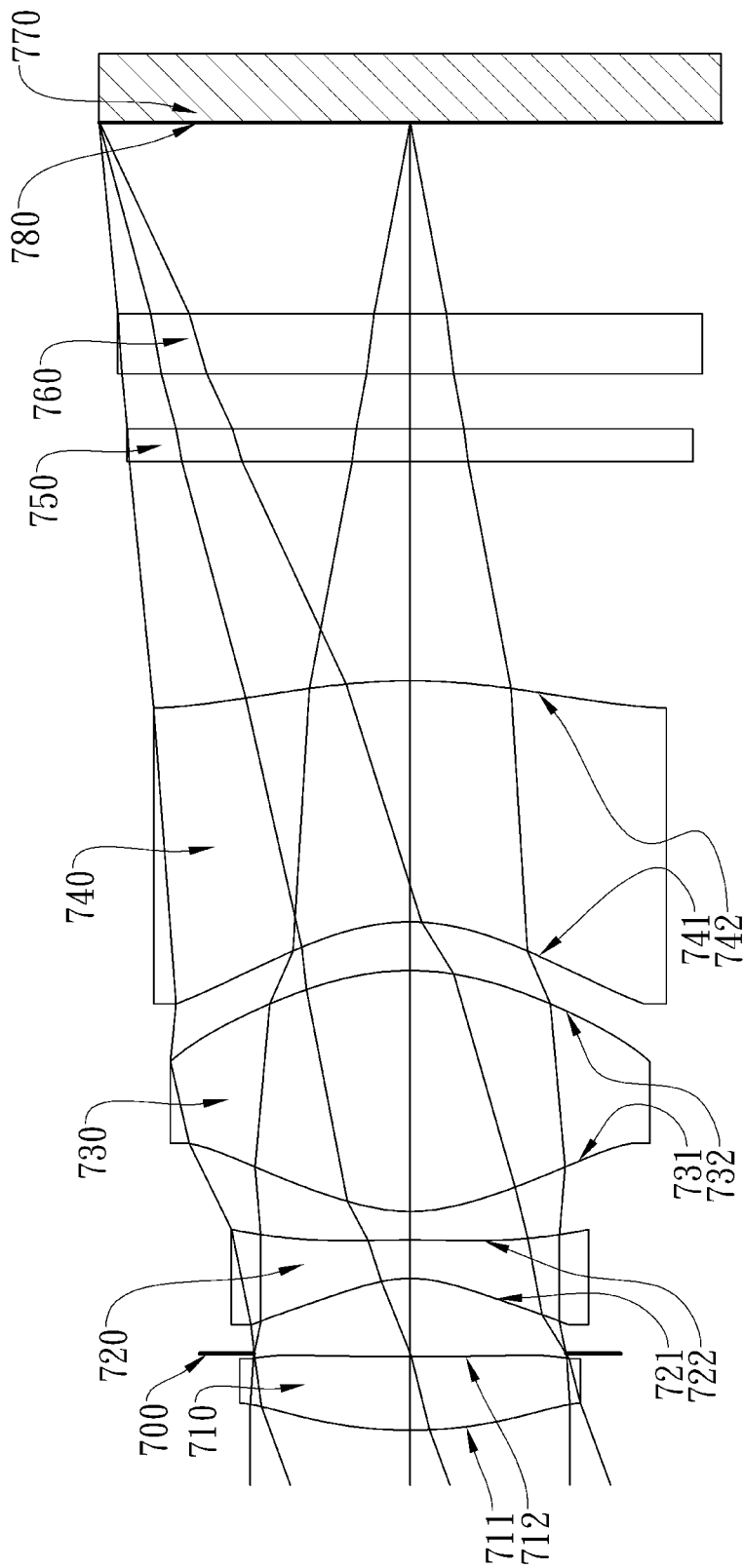
FIG. 7A shows an optical lens system in accordance with a seventh embodiment of the present invention.
Figure 7B:
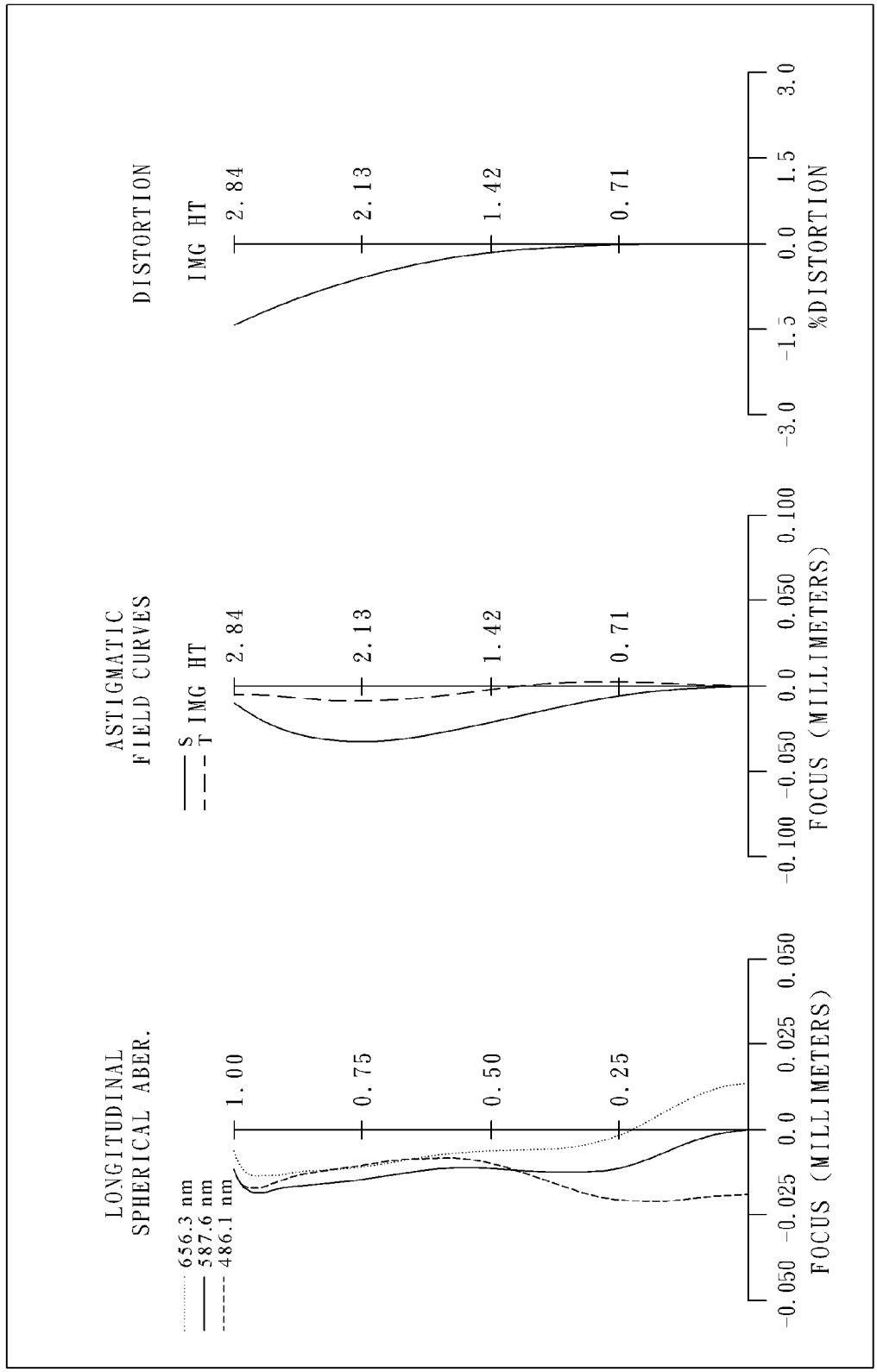
FIG. 7B shows the aberration curves of the seventh embodiment of the present invention.

FIG. 7A shows an optical lens system in accordance with the seventh embodiment of the present invention, and FIG. 7B shows the aberration curves of the seventh embodiment of the present invention. The optical lens system of the seventh embodiment of the present invention mainly comprises four lens elements, in order from an object side to an image side:

a plastic first lens element 710 with positive refractive power having a convex object-side surface 711 and a concave image-side surface 712, the object-side and image-side surfaces 711 and 712 thereof being aspheric;

a plastic second lens element 720 with negative refractive power having a concave object-side surface 721 and a convex image-side surface 722, the object-side and image-side surfaces 721 and 722 thereof being aspheric;

a plastic third lens element 730 with positive refractive power having a convex object-side surface 731 and a convex image-side surface 732, the object-side and image-side surfaces 731 and 732 thereof being aspheric; and a plastic fourth lens element 740 with negative refractive power having a concave object-side surface 741 and a convex image-side surface 742, the object-side and image-side surfaces 741 and 742 thereof being aspheric; wherein, the shape of the object-side surface 741 of the fourth lens element 740 changes from concave when near the optical axis to convex when away from the optical axis;

wherein an aperture stop 700 is disposed between the first lens element 710 and the second lens element 720;

the optical lens system further comprises a filter 750 disposed between the image-side surface 742 of the fourth lens element 740 and a cover glass 760; the filter 750 is an IR cut-filter made of glass and has no influence on the focal length of the optical lens system; the optical lens system further comprises an image sensor 770 provided on an image plane 780.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

(Embodiment 7)
f = 7.86 mm, Fno = 2.70, HFOV = 20.1 deg.

| Surface # | | Curvature Radius | Thickness | Material | Index | Focal length |
|---|---|---|---|---|---|---|
| 0 | Object | Plano | Infinity | | | |
| 1 | Lens 1 | 3.927200 (ASP) | 0.671 | Plastic | 1.530 | 8.11 |
| 2 | | 42.982400 (ASP) | 0.029 | E48R25 | | |
| 3 | Ape. Stop | Plano | 0.686 | | | |
| 4 | Lens 2 | −1.155850 (ASP) | 0.350 | Plastic | 1.530 | −2.39 |
| 5 | | −14.655100 (ASP) | 0.262 | E48R25 | | |
| 6 | Lens 3 | 1.517910 (ASP) | 2.200 | Plastic | 1.530 | 2.18 |
| 7 | | −2.403750 (ASP) | 0.445 | E48R25 | | |
| 8 | Lens 4 | −1.856950 (ASP) | 2.200 | Plastic | 1.608 | −5.94 |
| 9 | | −5.530300 (ASP) | 2.000 | SD1414 | | |
| 10 | Filter | Plano | 0.300 | Glass | 1.510 | — |
| 11 | | Plano | 0.500 | HOYA-BSC7 | | |
| 12 | Cover-glass | Plano | 0.550 | Glass | 1.510 | — |
| 13 | | Plano | 1.746 | HOYA-BSC7 | | |
| 14 | Image | Plano | — | | | |

* Reference wavelength for Focal length and Index calculation is 587.6 nm

TABLE 19

Aspheric Coefficients

| Surface # | 1 | 2 | 4 | 5 |
|---|---|---|---|---|
| k = | −1.00000E+01 | −1.00000E+00 | −5.15360E+00 | −1.00000E+01 |
| A4 = | 1.94354E−02 | 6.11851E−03 | 4.36719E−02 | 6.44087E−02 |
| A6 = | −7.71529E−03 | −8.06933E−03 | −2.09675E−02 | −2.54729E−02 |
| A8 = | 2.00360E−03 | 4.73672E−03 | 5.19662E−03 | 5.87600E−03 |
| A10 = | −7.78438E−04 | −3.40461E−03 | −1.45177E−03 | −1.03071E−03 |

TABLE 19-continued

| Aspheric Coefficients | | | |
|---|---|---|---|
| A12 = | 6.07414E−04 | 1.50006E−04 | 2.05641E−04 |
| A14 = |  | 4.99339E−05 | −1.99953E−05 |

| Surface # | 6 | 7 | 8 | 9 |
|---|---|---|---|---|
| k = | −6.76920E+00 | −4.10448E+00 | −2.50093E+00 | −1.00000E+00 |
| A4 = | 1.20157E−02 | −1.27502E−02 | 6.45199E−03 | 1.00477E−02 |
| A6 = | −3.79559E−03 | 5.24580E−03 | 1.25111E−03 | −4.17180E−04 |
| A8 = | 6.40900E−04 | −1.03416E−03 | −4.98841E−04 | 8.74516E−06 |
| A10 = | −1.03255E−04 | 4.59849E−05 | 5.72713E−05 | 9.09433E−07 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20; wherein the unit of FOV is expressed in degree (deg.).

TABLE 20

| (Embodiment 7) | |
|---|---|
| f [mm] | 7.86 |
| 3Fno | 2.70 |
| FOV [deg.] | 40.2 |
| |V1 − V2| | 0.0 |
| (T23 + T34)/CT3 | 0.32 |
| R5/f | 0.19 |
| R7/f | −0.24 |
| f/f1 | 0.97 |
| f4/f | −0.76 |
| f34/f | 0.37 |
| BFL/CT3 | 2.32 |
| SD/TD | 0.90 |
| tan(CRA) | 0.27 |

Embodiment 8

Figure 8A:
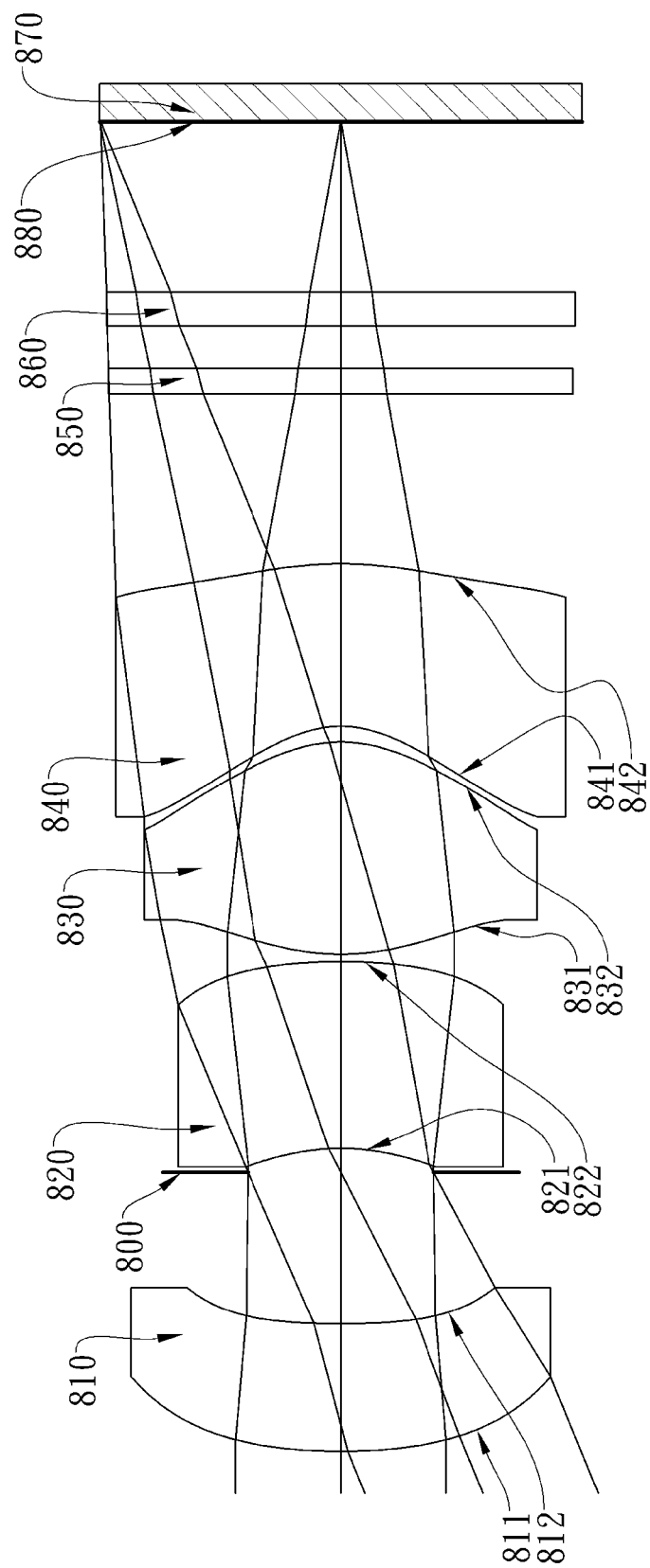
FIG. 8A shows an optical lens system in accordance with an eighth embodiment of the present invention.
Figure 8B:
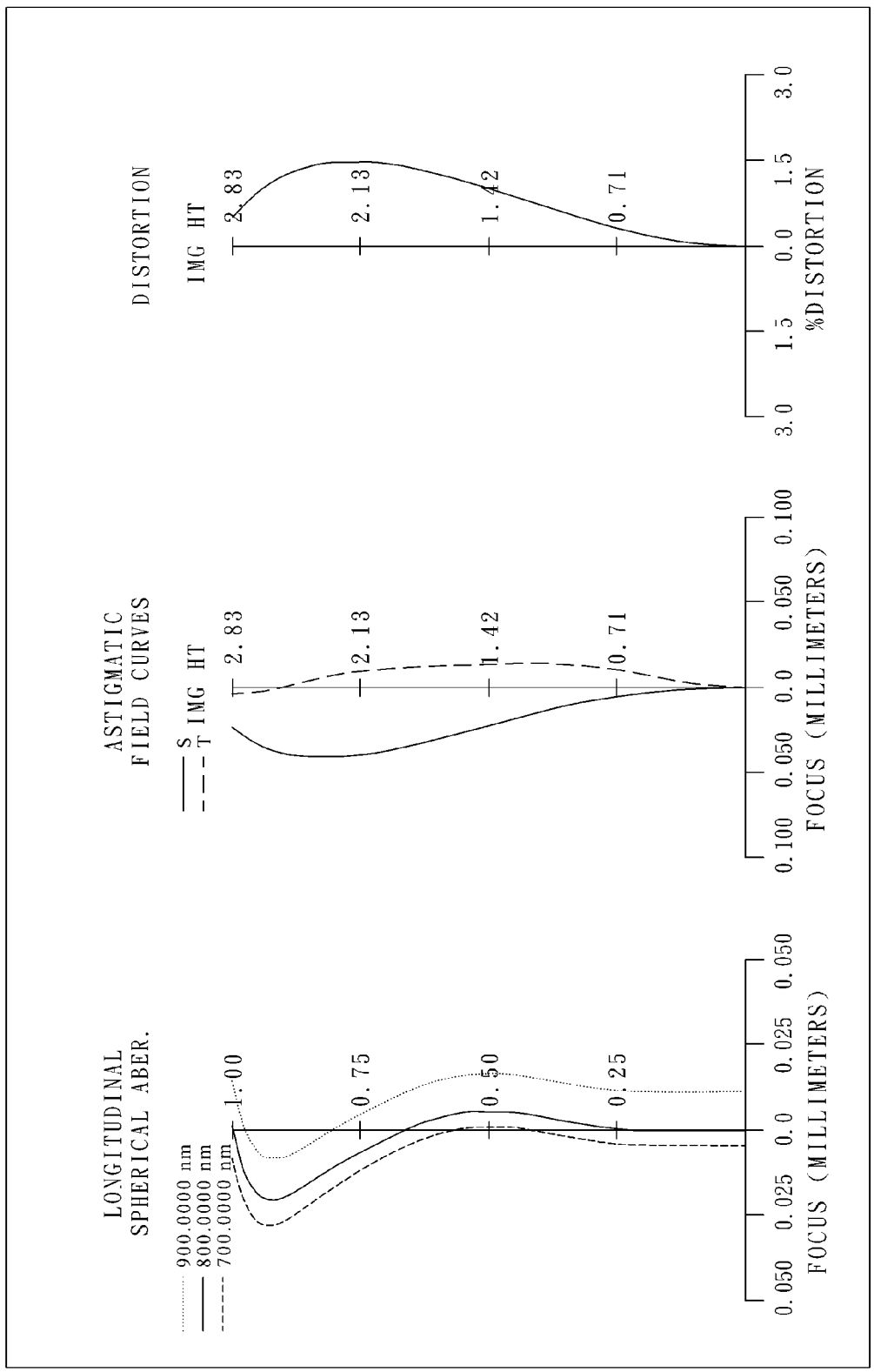
FIG. 8B shows the aberration curves of the eighth embodiment of the present invention.

FIG. 8A shows an optical lens system in accordance with the eighth embodiment of the present invention, and FIG. 8B shows the aberration curves of the eighth embodiment of the present invention. The optical lens system of the eighth embodiment of the present invention mainly comprises four lens elements, in order from an object side to an image side:

a plastic first lens element 810 with positive refractive power having a convex object-side surface 811 and a concave image-side surface 812, the object-side and image-side surfaces 811 and 812 thereof being aspheric;

a plastic second lens element 820 with negative refractive power having a concave object-side surface 821 and a convex image-side surface 822, the object-side and image-side surfaces 821 and 822 thereof being aspheric;

a plastic third lens element 830 with positive refractive power having a convex object-side surface 831 and a convex image-side surface 832, the object-side and image-side surfaces 831 and 832 thereof being aspheric; and a plastic fourth lens element 840 with negative refractive power having a concave object-side surface 841 and a convex image-side surface 842, the object-side and image-side surfaces 841 and 842 thereof being aspheric; wherein, the shape of the object-side surface 841 of the fourth lens element 840 changes from concave when near the optical axis to convex when away from the optical axis;

wherein an aperture stop 800 is disposed between the first lens element 810 and the second lens element 820;

the optical lens system further comprises a filter 850 disposed between the image-side surface 842 of the fourth lens element 840 and a cover glass 860; the filter 850 is an IR pass-filter made of glass and has no influence on the focal length of the optical lens system; the optical lens system further comprises an image sensor 870 provided on an image plane 880.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

| (Embodiment 8) f = 6.95 mm, Fno = 2.80, HFOV = 22.1 deg. | | | | | | |
|---|---|---|---|---|---|---|
| Surface # | | Curvature Radius | Thickness | Material | Index | Focal length |
| 0 | Object | Plano | Infinity | | | |
| 1 | Lens 1 | 6.756300 (ASP) | 1.502 | Plastic | 1.507 | 33.08 |
| 2 | | 10.461500 (ASP) | 1.782 | ARTON-D4532 | | |
| 3 | Ape. Stop | Plano | 0.282 | | | |
| 4 | Lens 2 | −2.556870 (ASP) | 2.200 | Plastic | 1.507 | −9.58 |
| 5 | | −6.959800 (ASP) | 0.094 | ARTON-D4532 | | |
| 6 | Lens 3 | 2.803210 (ASP) | 2.500 | Glass | 1.511 | 2.48 |
| 7 | | −1.618800 (ASP) | 0.184 | SUMITA-KPBK40 | | |
| 8 | Lens 4 | −1.272500 (ASP) | 1.915 | Plastic | 1.571 | −3.97 |
| 9 | | −4.492800 (ASP) | 2.000 | PC | | |
| 10 | Filter | Plano | 0.300 | Glass | 1.510 | — |
| 11 | | Plano | 0.500 | HOYA-BSC7 | | |
| 12 | Cover-glass | Plano | 0.400 | Glass | 1.510 | — |
| 13 | | Plano | 2.004 | HOYA-BSC7 | | |
| 14 | Image | Plano | — | | | |

* Reference wavelength for Focal length and Index calculation is 800.0 nm

TABLE 22

Aspheric Coefficients

| Surface # | 1 | 2 | 4 | 5 |
|---|---|---|---|---|
| k = | −7.33581E+00 | −9.90000E+01 | −2.43506E−01 | −5.40645E−01 |
| A4 = | 1.21569E−02 | 3.20996E−02 | 3.81453E−02 | −1.21312E−02 |
| A6 = | −1.45133E−04 | −3.96600E−03 | −1.78805E−02 | −8.53043E−04 |
| A8 = | 6.01263E−05 | 1.68541E−03 | 1.58960E−02 | −3.77406E−04 |
| A10 = | −1.86198E−07 | −2.08963E−04 | −1.77168E−02 | 7.07523E−05 |
| A12 = | | | 1.13271E−02 | 7.58292E−07 |
| A14 = | | | −3.02677E−03 | −1.82400E−06 |

| Surface # | 6 | 7 | 8 | 9 |
|---|---|---|---|---|
| k = | −1.43108E+00 | −2.30531E+00 | −1.71526E+00 | −6.73273E+00 |
| A4 = | −1.78945E−02 | 2.37627E−03 | 2.44983E−02 | 7.68624E−03 |
| A6 = | 2.66310E−03 | 1.92826E−03 | −3.51763E−03 | 3.34691E−04 |
| A8 = | −8.89249E−04 | −8.43278E−04 | 2.65369E−04 | −2.21632E−04 |
| A10 = | 6.82978E−05 | 9.61616E−05 | 7.67337E−06 | 1.29792E−05 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23; wherein the unit of FOV is expressed in degree (deg.).

TABLE 23

(Embodiment 8)

| f [mm] | 6.95 |
|---|---|
| Fno | 2.80 |
| FOV [deg.] | 44.2 |
| |V1 − V2| | 0.0 |
| (T23 + T34)/CT3 | 0.11 |
| R5/f | 0.40 |
| R7/f | −0.18 |
| f/f1 | 0.21 |
| f4/f | −0.57 |
| f34/f | 0.78 |
| BFL/CT3 | 2.08 |
| SD/TD | 0.69 |
| tan(CRA) | 0.21 |

Embodiment 9

Figure 9A:
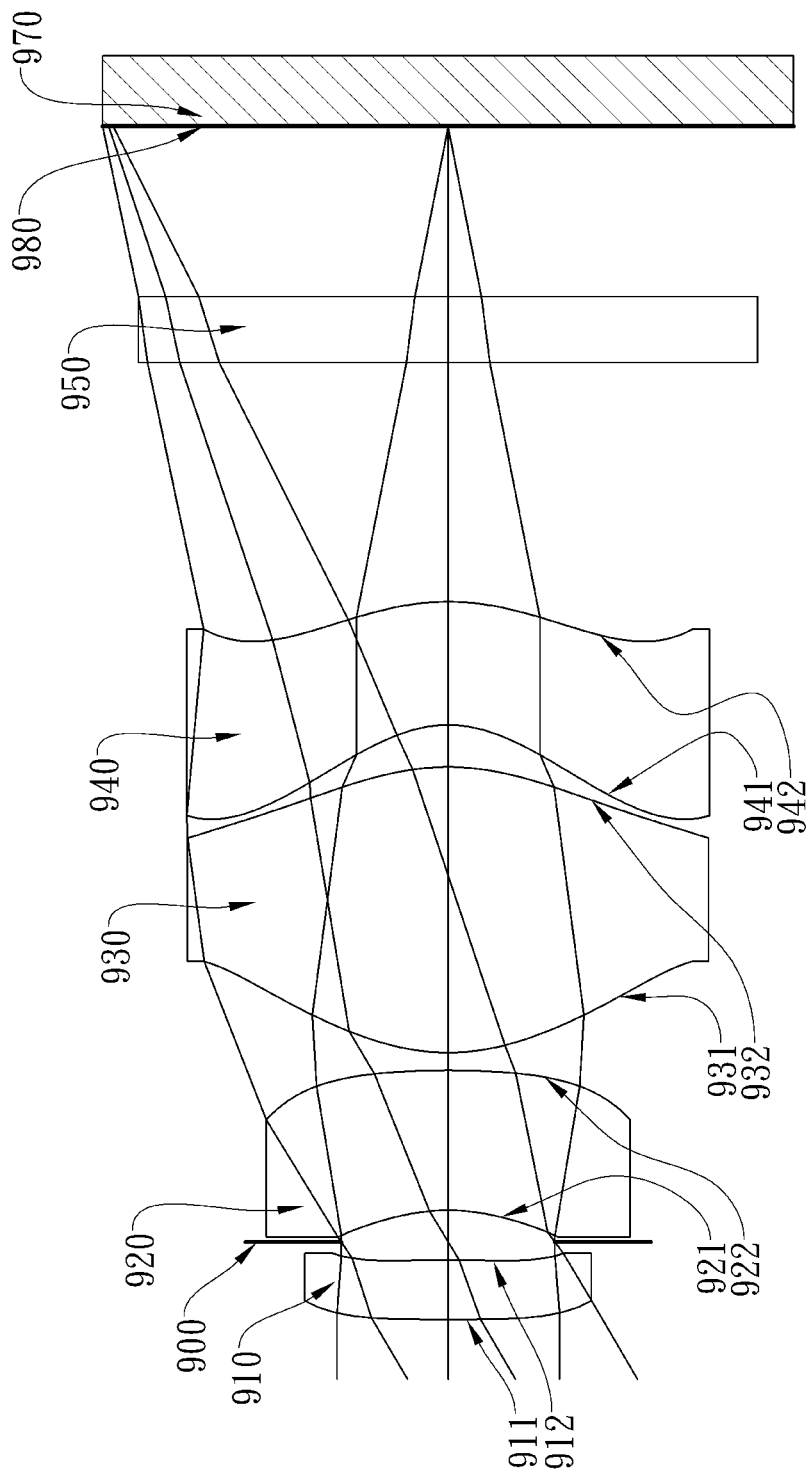
FIG. 9A shows an optical lens system in accordance with a ninth embodiment of the present invention.
Figure 9B:
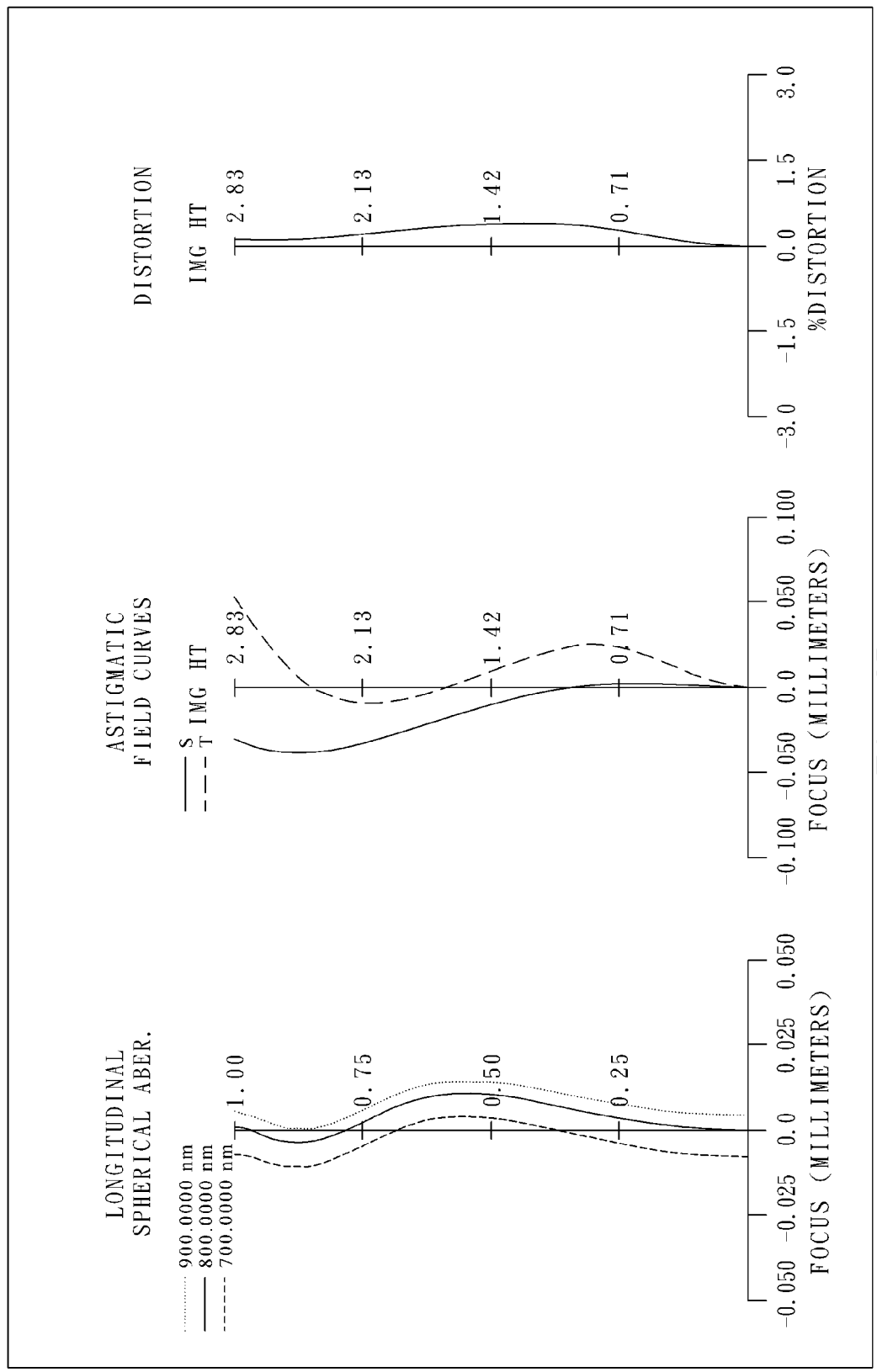
FIG. 9B shows the aberration curves of the ninth embodiment of the present invention.

FIG. 9A shows an optical lens system in accordance with the ninth embodiment of the present invention, and FIG. 9B shows the aberration curves of the ninth embodiment of the present invention. The optical lens system of the ninth embodiment of the present invention mainly comprises four lens elements, in order from an object side to an image side:

a plastic first lens element 910 with positive refractive power having a convex object-side surface 911 and a convex image-side surface 912, the object-side and image-side surfaces 911 and 912 thereof being aspheric;

a plastic second lens element 920 with negative refractive power having a concave object-side surface 921 and a convex image-side surface 922, the object-side and image-side surfaces 921 and 922 thereof being aspheric;

a plastic third lens element 930 with positive refractive power having a convex object-side surface 931 and a convex image-side surface 932, the object-side and image-side surfaces 931 and 932 thereof being aspheric; and a plastic fourth lens element 940 with negative refractive power having a concave object-side surface 941 and a convex image-side surface 942, the object-side and image-side surfaces 941 and 942 thereof being aspheric; wherein, the shape of the object-side surface 941 of the fourth lens element 940 changes from concave when near the optical axis to convex when away from the optical axis;

wherein an aperture stop 900 is disposed between the first lens element 910 and the second lens element 920;

the optical lens system further comprises a filter 950 disposed between the image-side surface 942 of the fourth lens element 940 and an image plane 980; the filter 950 is an IR pass-filter made of glass and has no influence on the focal length of the optical lens system; the optical lens system further comprises an image sensor 970 provided on the image plane 980.

The detailed optical data of the ninth embodiment is shown in TABLE 24, and the aspheric surface data is shown in TABLE 25 wherein the units of the curvature radius, the thickness and the focal length are expressed in mm, and HFOV is half of the maximal field of view.

TABLE 24

(Embodiment 9)
f = 4.83 mm, Fno = 2.60, HFOV = 30.4 deg.

| Surface # | | Curvature Radius | Thickness | Material | Index | Focal length |
|---|---|---|---|---|---|---|
| 0 | Object | Plano | Infinity | | | |
| 1 | Lens 1 | 67.294800 (ASP) | 0.498 | Plastic | 1.507 | 15.69 |
| 2 | | −9.007100 (ASP) | 0.150 | ARTON-D4532 | | |
| 3 | Ape. Stop | Plano | 0.266 | | | |
| 4 | Lens 2 | −1.576460 (ASP) | 1.168 | Plastic | 1.537 | −3.99 |
| 5 | | −7.509700 (ASP) | 0.150 | APEL-5514ML | | |
| 6 | Lens 3 | 1.751360 (ASP) | 2.388 | Plastic | 1.537 | 2.23 |
| 7 | | −1.981040 (ASP) | 0.351 | APEL-5514ML | | |
| 8 | Lens 4 | −1.011210 (ASP) | 1.030 | Plastic | 1.622 | −5.39 |

TABLE 24-continued (Embodiment 9)
f = 4.83 mm, Fno = 2.60, HFOV = 30.4 deg.

| Surface # | | Curvature Radius | Thickness | Material | Index | Focal length |
|---|---|---|---|---|---|---|
| 9 | | −2.013760 (ASP) | 2.000 | SP3810 | | |
| 10 | Filter | Plano | 0.550 | Glass | 1.510 | — |
| 11 | | Plano | 1.424 | HOYA-BSC7 | | |
| 12 | Image | Plano | — | | | |

* Reference wavelength for Focal length and Index calculation is 800.0 nm

TABLE 25

Aspheric Coefficients

| Surface # | 1 | 2 | 4 | 5 |
|---|---|---|---|---|
| k = | −1.00000E+01 | −1.00000E+01 | −3.24237E+00 | −1.05262E+00 |
| A4 = | 6.19246E−02 | 1.29110E−01 | 7.12407E−02 | −1.47859E−02 |
| A6 = | 1.08579E−02 | −1.69671E−02 | −1.15906E−01 | −2.52212E−02 |
| A8 = | −1.18517E−02 | 1.34437E−02 | 8.80044E−02 | 9.54154E−03 |
| A10 = | 6.65404E−03 | −2.35857E−03 | −5.36583E−02 | −2.23788E−03 |
| A12 = | | | 1.22686E−02 | 8.09643E−05 |
| A14 = | | | −2.95524E−03 | −2.09310E−05 |

| Surface # | 6 | 7 | 8 | 9 |
|---|---|---|---|---|
| k = | −2.66297E+00 | −3.91057E+00 | −1.85849E+00 | −2.23851E+00 |
| A4 = | −7.33198E−03 | 8.36212E−03 | 3.44626E−02 | 2.86259E−02 |
| A6 = | 5.43922E−03 | 2.31378E−03 | −1.92032E−03 | 1.61385E−03 |
| A8 = | −1.46754E−03 | −8.58323E−04 | 3.34966E−04 | 2.92661E−05 |
| A10 = | 7.24853E−05 | 7.08339E−05 | −1.99488E−05 | −2.10776E−05 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26; wherein the unit of FOV is expressed in degree (deg.).

TABLE 26

(Embodiment 9)

| | |
|---|---|
| f [mm] | 4.83 |
| Fno | 2.60 |
| FOV [deg.] | 60.8 |
| |V1 − V2| | 0.9 |
| (T23 + T34)/CT3 | 0.21 |
| R5/f | 0.36 |
| R7/f | −0.21 |
| f/f1 | 0.31 |
| f4/f | −1.12 |
| f34/f | 0.71 |
| BFL/CT3 | 1.66 |
| SD/TD | 0.89 |
| tan(CRA) | 0.33 |

Embodiment 10

Figure 10A:
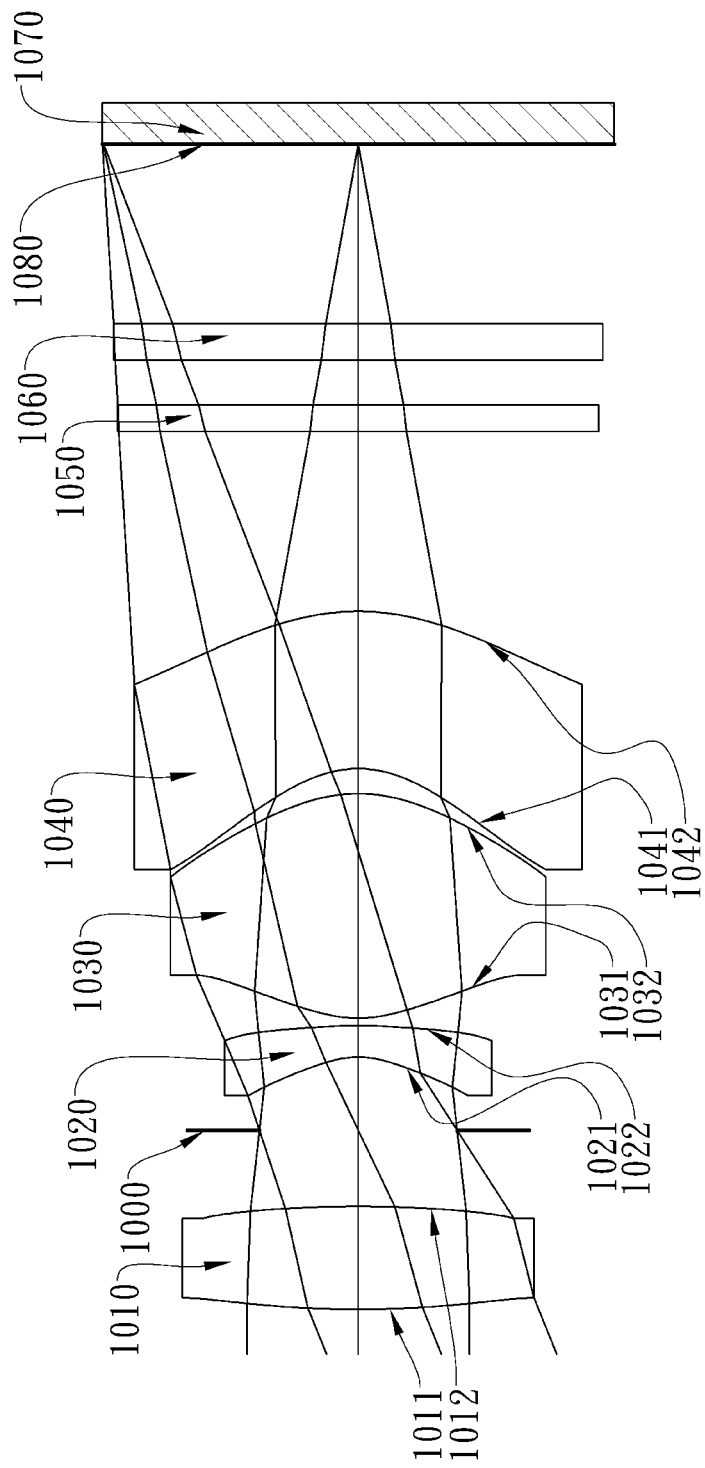
FIG. 10A shows an optical lens system in accordance with a tenth embodiment of the present invention.
Figure 10B:
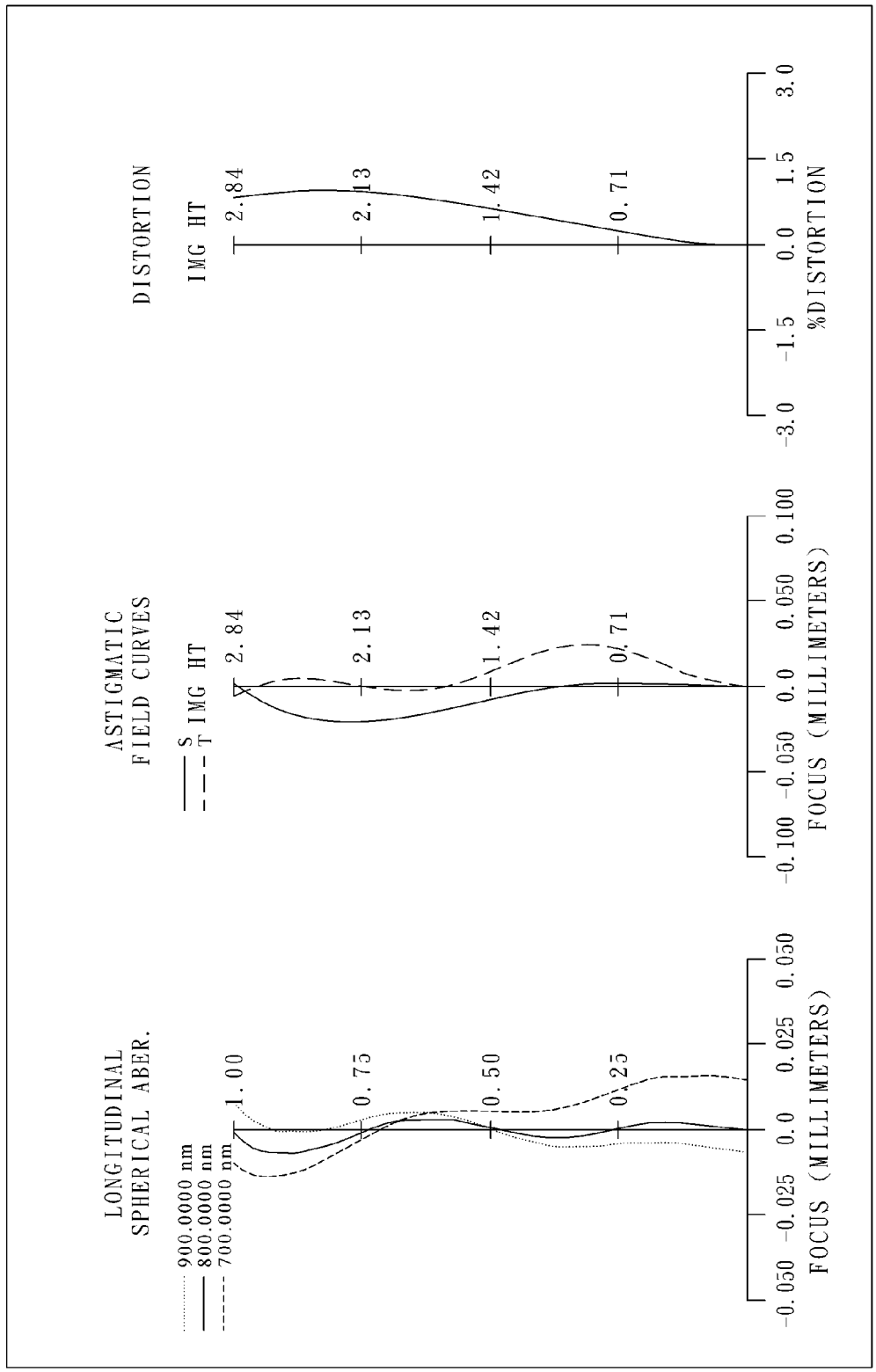
FIG. 10B shows the aberration curves of the tenth embodiment of the present invention.

FIG. 10A shows an optical lens system in accordance with the tenth embodiment of the present invention, and FIG. 10B shows the aberration curves of the tenth embodiment of the present invention. The optical lens system of the tenth embodiment of the present invention mainly comprises four lens elements, in order from an object side to an image side:

a plastic first lens element 1010 with positive refractive power having a convex object-side surface 1011 and a convex image-side surface 1012, the object-side and image-side surfaces 1011 and 1012 thereof being aspheric;

a plastic second lens element 1020 with negative refractive power having a concave object-side surface 1021 and a convex image-side surface 1022, the object-side and image-side surfaces 1021 and 1022 thereof being aspheric;

a plastic third lens element 1030 with positive refractive power having a convex object-side surface 1031 and a convex image-side surface 1032, the object-side and image-side surfaces 1031 and 1032 thereof being aspheric; and a plastic fourth lens element 1040 with negative refractive power having a concave object-side surface 1041 and a convex image-side surface 1042, the object-side and image-side surfaces 1041 and 1042 thereof being aspheric; wherein, the shape of the object-side surface 1041 of the fourth lens element 1040 changes from concave when near the optical axis to convex when away from the optical axis;

wherein an aperture stop 1000 is disposed between the first lens element 1010 and the second lens element 1020;

the optical lens system further comprises a filter 1050 disposed between the image-side surface 1042 of the fourth lens element 1040 and a cover glass 1060; the filter 1050 is an IR pass-filter made of glass and has no influence on the focal length of the optical lens system; the optical lens system further comprises an image sensor 1070 provided on an image plane 1080.

The detailed optical data of the tenth embodiment is shown in TABLE 27, and the aspheric surface data is shown in TABLE 28, wherein the units of the curvature radius, the thickness and the focal length are expressed in mm, and HFOV is half of the maximal field of view.

TABLE 27

(Embodiment 10)
f = 6.93 mm, Fno = 2.80, HFOV = 22.1 deg.

| Surface # | | Curvature Radius | Thickness | Material | Index | Focal length |
|---|---|---|---|---|---|---|
| 0 | Object | Plano | Infinity | | | |
| 1 | Lens 1 | 11.484300 (ASP) | 1.144 | Plastic | 1.571 | 11.14 |
| 2 | | −13.729900 (ASP) | 0.850 | PC | | |
| 3 | Ape. Stop | Plano | 0.815 | | | |
| 4 | Lens 2 | −0.920770 (ASP) | 0.350 | Plastic | 1.571 | −2.13 |
| 5 | | −4.354300 (ASP) | 0.082 | PC | | |
| 6 | Lens 3 | 1.296090 (ASP) | 2.500 | Plastic | 1.528 | 1.96 |
| 7 | | −1.725970 (ASP) | 0.278 | F52R | | |
| 8 | Lens 4 | −1.190230 (ASP) | 1.751 | Plastic | 1.571 | −6.84 |
| 9 | | −2.627920 (ASP) | 2.000 | PC | | |
| 10 | Filter | Plano | 0.300 | Glass | 1.510 | — |
| 11 | | Plano | 0.500 | HOYA-BSC7 | | |
| 12 | Cover-glass | Plano | 0.400 | Glass | 1.510 | — |
| 13 | | Plano | 2.002 | HOYA-BSC7 | | |
| 14 | Image | Plano | — | | | |

\* Reference wavelength for Focal length and Index calculation is 800.0 nm

TABLE 28

Aspheric Coefficients

| Surface # | 1 | 2 | 4 | 5 |
|---|---|---|---|---|
| k = | −1.84116E+01 | −1.15358E+01 | −5.49134E+00 | −9.90000E+01 |
| A4 = | 1.94583E−03 | 2.82324E−03 | 1.52469E−02 | 2.50102E−02 |
| A6 = | −4.94882E−04 | −1.63850E−03 | −3.01915E−02 | −2.52152E−02 |
| A8 = | −6.53026E−05 | −1.75717E−04 | 2.17558E−02 | 3.42044E−03 |
| A10 = | −9.52046E−06 | 3.40279E−05 | −1.75123E−02 | 1.65285E−03 |
| A12 = | | | 8.80614E−03 | −9.21466E−04 |
| A14 = | | | −1.92436E−03 | 1.26741E−04 |

| Surface # | 6 | 7 | 8 | 9 |
|---|---|---|---|---|
| k = | −7.76685E+00 | −2.10839E+00 | −1.18759E+00 | −1.12750E+00 |
| A4 = | 1.39212E−02 | 2.01672E−03 | 4.29527E−02 | 1.01411E−02 |
| A6 = | −7.82303E−03 | 2.74231E−03 | −7.22709E−03 | −2.03315E−04 |
| A8 = | 1.61177E−03 | −9.33685E−04 | 9.84953E−04 | 1.04760E−05 |
| A10 = | −2.93393E−04 | 6.84716E−05 | −4.58319E−05 | −2.68873E−06 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29; wherein the unit of FOV is expressed in degree (deg.).

TABLE 29

(Embodiment 10)

| f [mm] | 6.93 |
|---|---|
| Fno | 2.80 |
| FOV [deg.] | 44.2 |
| \|V1 − V2\| | 0.0 |
| (T23 + T34)/CT3 | 0.14 |
| R5/f | 0.19 |
| R7/f | −0.17 |
| f/f1 | 0.62 |
| f4/f | −0.99 |
| f34/f | 0.40 |
| BFL/CT3 | 2.08 |
| SD/TD | 0.74 |
| tan(CRA) | 0.21 |

It is to be noted that TABLES 1-29 show different data of the different embodiments, however, the data of the different embodiments are obtained from experiments. Therefore, any optical lens system of the same structure is considered to be within the scope of the present invention even if it uses different data. The embodiments depicted above and the appended drawings are exemplary and are not intended to limit the scope of the present invention.

What is claimed is:

1. An optical lens system, in order from an object side to an image side comprising:
   a first lens element having a convex object-side surface in proximity to an optical axis;
   a second lens element with negative refractive power having a concave object-side surface in proximity to the optical axis and a convex image-side surface in proximity to the optical axis;
   a third lens element with positive refractive power having a convex object-side surface in proximity to the optical axis and a convex image-side surface in proximity to the optical axis;
   a plastic fourth lens element with negative refractive power having a concave object-side surface in proximity to the optical axis and a convex image-side surface in proximity to the optical axis, with both the object-side and image-side surfaces thereof being aspheric;

wherein the optical lens system comprises a total of four lens elements with refractive power;

wherein a focal length of the fourth lens element is f4, a focal length of the optical lens system is f, an axial distance between the second lens element and the third lens element is T23, an axial distance between the third lens element and the fourth lens element is T34, a central thickness of the third lens element is CT3, a focal length of the first lens element is f1, and they satisfy the following relations:

$-1.25<f4/f<-0.30$;

$0<(T23+T34)/CT3<0.85$; and $-0.70<f/f1<0.62$.

2. An optical lens system, in order from an object side to an image side comprising:

a first lens element having a convex object-side surface in proximity to an optical axis;

a second lens element with negative refractive power having a concave object-side surface in proximity to the optical axis and a convex image-side surface in proximity to the optical axis;

a third lens element with positive refractive power;

a plastic fourth lens element with negative refractive power having a concave object-side surface in proximity to the optical axis and a convex image-side surface in proximity to the optical axis, with both the object-side and image-side surfaces thereof being aspheric;

wherein the optical lens system comprises a total of four lens elements with refractive power;

wherein a focal length of the optical lens system is f, a focal length of the first lens element is f1, a focal length of the fourth lens element is f4, an axial distance between the second lens element and the third lens element is T23, an axial distance between the third lens element and the fourth lens element is T34, a central thickness of the third lens element is CT3, and they satisfy the following relations:

$-0.70<f/f1<0.62$;

$-1.25<f4/f<-0.30$; and $0<(T23+T34)/CT3<0.85$.

3. An optical lens system, in order from an object side to an image side comprising:

a first lens element having a convex object-side surface in proximity to an optical axis;

a second lens element with negative refractive power having a concave object-side surface in proximity to the optical axis and a convex image-side surface in proximity to the optical axis;

a third lens element with positive refractive power having a convex object-side surface in proximity to the optical axis and a convex image-side surface in proximity to the optical axis;

a plastic fourth lens element with negative refractive power having a concave object-side surface in proximity to the optical axis and a convex image-side surface in proximity to the optical axis, with both the object-side and image-side surfaces thereof being aspheric;

wherein the shape of the object-side surface of the fourth lens element changes from concave when near the optical axis to convex when away from the optical axis;

wherein the optical lens system comprises a total of four lens elements with refractive power;

wherein an axial distance between the second lens element and the third lens element is T23, an axial distance between the third lens element and the fourth lens element is T34, a central thickness of the third lens element is CT3, a back focal length of the optical lens system is BFL, a focal length of the optical lens system is f, a focal length of the first lens element is f1, and they satisfy the following relations:

$0<(T23+T34)/CT3<0.85$;

$1.45<BFL/CT3<3.5$; and $-0.70<f/f1\leq0.62$.

4. The optical lens system according to claim 1, wherein a composite focal length of the third lens element and the fourth lens element is f34, the focal length of the optical lens system is f, and they satisfy the following relation:

$0.2<f34/f<2.0$.

5. The optical lens system according to claim 1, wherein the focal length of the optical lens system is f, a focal length of the first lens element is f1, and they satisfy the following relation:

$-0.65<f/f1<0.62$.

6. The optical lens system according to claim 1, wherein a chief ray angle of the optical lens system is CRA, and it satisfies the following relation:

$0<\tan(CRA)<0.4$.

7. The optical lens system according to claim 1, wherein the axial distance between the second lens element and the third lens element is T23, the axial distance between the third lens element and the fourth lens element is T34, the central thickness of the third lens element is CT3, and they satisfy the following relation:

$0<(T23+T34)/CT3<0.40$.

8. The optical lens system according to claim 1, wherein the optical lens system is applicable for the wavelength range of 750 nm~1200 nm.

9. The optical lens system according to claim 1, wherein the shape of the object-side surface of the fourth lens element changes from concave when near the optical axis to convex when away from the optical axis.

10. The optical lens system according to claim 2, wherein the shape of the object-side surface of the fourth lens element changes from concave when near the optical axis to convex when away from the optical axis.

11. The optical lens system according to claim 2, wherein a back focal length of the optical lens system is BFL, the central thickness of the third lens element is CT3, and they satisfy the following relation:

$1.45<BFL/CT3<3.5$.

12. The optical lens system according to claim 2, wherein the optical lens system is applicable for the wavelength range of 750 nm~1200 nm.

13. The optical lens system according to claim 2, wherein a chief ray angle of the optical lens system is CRA, and it satisfies the following relation:

$0<\tan(CRA)<0.4$.

14. The optical lens system according to claim 3, wherein a focal length of the fourth lens element is f4, a focal length of the optical lens system is f, and they satisfy the following relation:

$-1.25 < f4/f < -0.30.$

15. The optical lens system according to claim 3, wherein a chief ray angle of the optical lens system is CRA, and it satisfies the following relation:

$0 < \tan(CRA) < 0.4.$

16. The optical lens system according to claim 3, wherein the optical lens system is applicable for the wavelength range of 750 nm~1200 nm.

17. The optical lens system according to claim 4, further comprising a stop, an axial distance between the stop and the image-side surface of the fourth lens element is SD, an axial distance between the object-side surface of the first lens element and the image-side surface of the fourth lens element is TD, and they satisfy the following relation:

$0.50 < SD/TD < 0.93.$

18. The optical lens system according to claim 4, wherein an Abbe number of the first lens element is V1, an Abbe number of the second lens element is V2, and they satisfy the following relation:

$|V1 - V2| < 15.$

19. The optical lens system according to claim 4, wherein a curvature radius of the object-side surface of the fourth lens element is R7, the focal length of the optical lens system is f, and they satisfy the following relation:

$-0.7 < R7/f < 0.$

20. The optical lens system according to claim 4, wherein a back focal length of the optical lens system is BFL, the central thickness of the third lens element is CT3, and they satisfy the following relation:

$1.45 < BFL/CT3 < 3.5.$

21. The optical lens system according to claim 10, wherein a composite focal length of the third lens element and the fourth lens element is f34, the focal length of the optical lens system is f, and they satisfy the following relation:

$0.2 < f34/f < 2.0.$

22. The optical lens system according to claim 10, wherein the third lens element has a convex object-side surface in proximity to the optical axis and a convex image-side surface in proximity to the optical axis, a curvature radius of the object-side surface of the third lens element is R5, the focal length of the optical lens system is f, and they satisfy the following relation:

$0 < R5/f < 0.7.$

23. The optical lens system according to claim 11, wherein an Abbe number of the first lens element is V1, an Abbe number of the second lens element is V2, and they satisfy the following relation:

$|V1 - V2| < 15.$

24. The optical lens system according to claim 11, wherein a field of view of the optical lens system is FOV, and it satisfies the following relation:

25 degree < FOV < 80 degree.

25. The optical lens system according to claim 17, wherein the first lens element has positive refractive power.

26. The optical lens system according to claim 17, wherein a field of view of the optical lens system is FOV, and it satisfies the following relation:

25 degree < FOV < 80 degree.

* * * * *

UNITED STATES PATENT AND TRADEMARK OFFICE
CERTIFICATE OF CORRECTION

PATENT NO. : 8,891,178 B2  
APPLICATION NO. : 13/532488  
DATED : November 18, 2014  
INVENTOR(S) : Chih-Wen Hsu Page 1 of 1

It is certified that error appears in the above-identified patent and that said Letters Patent is hereby corrected as shown below:

In the Claims

Column 33, Claim 1, Line 17, the left-hand formula should appear as follows:
$-0.70 < f/f1 \leq 0.62$.

Column 33, Claim 2, Line 43, the left-hand formula should appear as follows:
$-0.70 < f/f1 \leq 0.62$;

Column 34, Claim 5, Line 28, the right-hand formula should appear as follows:
$-0.65 < f/f1 \leq 0.62$.

Signed and Sealed this
Nineteenth Day of May, 2015

Michelle K. Lee
*Director of the United States Patent and Trademark Office*